(12) United States Patent
Futami et al.

(10) Patent No.: US 9,160,026 B2
(45) Date of Patent: Oct. 13, 2015

(54) GAS FLOW PASSAGE FORMING MEMBER, METHOD OF MANUFACTURING THE GAS FLOW PASSAGE FORMING MEMBER, AND DEVICE FOR FORMING THE GAS FLOW PASSAGE FORMING MEMBER

(75) Inventors: Satoshi Futami, Kariya (JP); Keiji Hashimoto, Kariya (JP); Tomokazu Hayashi, Seto (JP)

(73) Assignees: Toyota Shatai Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 57 days.

(21) Appl. No.: 12/867,268

(22) PCT Filed: Jun. 16, 2009

(86) PCT No.: PCT/JP2009/060954
§ 371 (c)(1),
(2), (4) Date: Aug. 12, 2010

(87) PCT Pub. No.: WO2009/154203
PCT Pub. Date: Dec. 23, 2009

(65) Prior Publication Data
US 2011/0076596 A1     Mar. 31, 2011

(30) Foreign Application Priority Data

| Jun. 16, 2008 | (JP) | 2008-156571 |
| Oct. 20, 2008 | (JP) | 2008-270026 |
| Oct. 20, 2008 | (JP) | 2008-270027 |
| Apr. 28, 2009 | (WO) | PCT/JP2009/058343 |
| May 7, 2009 | (WO) | PCT/JP2009/058628 |

(51) Int. Cl.
  *H01M 8/02* (2006.01)
  *H01M 8/24* (2006.01)
  *H01M 8/10* (2006.01)

(52) U.S. Cl.
  CPC ............ *H01M 8/242* (2013.01); *H01M 8/0206* (2013.01); *H01M 8/0232* (2013.01);
  (Continued)

(58) Field of Classification Search
CPC . H01M 8/0247; H01M 8/025; H01M 8/0252; H01M 8/0254; H01M 8/0258; H01M 8/026; H01M 8/0265; H01M 8/0206; H01M 8/0208; H01M 8/021
USPC ............................ 429/400–535; 29/2, 6.1–6.2
See application file for complete search history.

(56) References Cited

U.S. PATENT DOCUMENTS 3,607,411 A * 9/1971 Brownrigg .................... 429/242
3,853,626 A * 12/1974 Daniels et al. ..................... 29/2
6,007,933 A * 12/1999 Jones ............................ 429/481

(Continued)

FOREIGN PATENT DOCUMENTS

| JP | 7-254424 | 10/1995 |
| JP | 8-138701 | 5/1996 |

(Continued)

OTHER PUBLICATIONS

International Search Report in International Application No. PCT/JP2009/060954, Mailing Date: Aug. 25, 2009.

(Continued)

*Primary Examiner* — Barbara Gilliam
*Assistant Examiner* — Helen M McDermott
(74) *Attorney, Agent, or Firm* — Finnegan, Henderson, Farabow, Garrett & Dunner, LLP

(57) ABSTRACT

An MEA 15 is arranged between frames 13, 14. A first gas flow passage forming member 21 is arranged between an anode electrode layer 17 of the MEA 15 and a first separator 23 fixed to an upper surface of the frame 13. A second gas flow passage forming member 22 is arranged between a cathode electrode layer 18 of the MEA 15 and a second separator 24 fixed to a lower surface of the frame 14. The gas flow passage forming members 21, 22 are each formed by a metal lath 25. The metal lath is formed by forming a plurality of through holes 26 in a thin metal plate in a mesh-like manner and forming the thin metal plate in a stepped shape. The gas flow passage forming members 21, 22 each include a plurality of annular portions 27 forming the through holes 26. Each of the annular portions 27 has a flat surface portion 28a in a first contact portion 28, which contacts a carbon paper 19, 20.

7 Claims, 23 Drawing Sheets

(52) U.S. Cl.
CPC .......... *H01M 8/0245* (2013.01); *H01M 8/0247* (2013.01); *H01M 8/0273* (2013.01); *H01M 8/0228* (2013.01); *H01M 8/0234* (2013.01); *H01M 2008/1095* (2013.01); *Y02E 60/50* (2013.01); *Y10T 83/04* (2015.04); *Y10T 83/0429* (2015.04); *Y10T 83/6484* (2015.04); *Y10T 83/8727* (2015.04)

(56) References Cited

U.S. PATENT DOCUMENTS

| | | | |
|---|---|---|---|
| 2007/0231593 A1* | 10/2007 | Ryu et al. ................. | 428/596 |
| 2009/0089989 A1 | 4/2009 | Hashimoto et al. | |
| 2009/0155665 A1 | 6/2009 | Hashimoto | |

FOREIGN PATENT DOCUMENTS

| | | |
|---|---|---|
| JP | 2005-310633 | 11/2005 |
| JP | 2007-26812 | 2/2007 |
| JP | 2007-87768 | 4/2007 |
| JP | 2007-214020 | 8/2007 |
| JP | 2008-108573 | 5/2008 |
| JP | 2008-146947 | 6/2008 |
| JP | 2008-243394 | 10/2008 |

OTHER PUBLICATIONS

English-language International Preliminary Report on Patentability for PCT/JP2009/060954 dated Jan. 11, 2011.

* cited by examiner

GAS FLOW PASSAGE FORMING MEMBER, METHOD OF MANUFACTURING THE GAS FLOW PASSAGE FORMING MEMBER, AND DEVICE FOR FORMING THE GAS FLOW PASSAGE FORMING MEMBER

CROSS-REFERENCE TO RELATED APPLICATIONS

This application is a national phase application of international Application No. PCT/JP2009/060954, filed Jun. 16, 2009, and claims the priority of Japanese Application Nos. 2008-156571, filed Jun. 16, 2008; 2008-270026, filed Oct. 20, 2008; 2008-270027, filed Oct. 20, 2008; and International Application Nos. PCT/JP2009/058343, filed Apr. 28, 2009; and PCT/JP2009/058628, filed May 7, 2009, the contents of all of which are incorporated herein by reference.

FIELD OF THE INVENTION

The present invention relates to a gas flow passage forming member arranged between a gas diffusion layer and a separator in a power generation cell of a fuel battery, a method for manufacturing the gas flow passage forming member, a forming device used to manufacture the gas flow passage forming member, a power generation cell for a fuel battery including the gas flow passage forming member, and a method for manufacturing the power generation cell for the fuel battery.

BACKGROUND OF THE INVENTION

Conventionally, a polymer electrolyte fuel battery disclosed in Patent Document 1 has been proposed. This type of fuel battery is configured by a fuel battery stack formed by stacking power generation cells. Each of the power generation cells includes a membrane electrode assembly having an electrolyte membrane, an anode electrode layer, and a cathode electrode layer. The anode electrode layer is formed on a first surface of the electrolyte membrane and the cathode electrode layer is deposited on a second surface of the electrolyte membrane. Fuel gas such as hydrogen gas and oxidant gas such as air are supplied to the anode electrode layer and the cathode electrode layer through a gas flow passage forming member (a collector). This causes an electrode reaction in the membrane electrode assembly, thus generating power. The generated power is output to the exterior through the collector and a plate-like separator.

The gas flow passage forming member must be capable of efficiently supplying both of the fuel gas and the oxidant gas to the anode electrode layer and the cathode electrode layer. According to the configuration disclosed in Patent Document 1, the gas flow passage forming member is configured by a metal lath formed into a metal plate. A plurality of small through holes with predetermined shapes are formed in the metal lath. Also, substantially hexagonal through holes are formed in the metal lath in a mesh-like manner by machining a stainless steel plate with the thickness of approximately 0.1 mm into metal lath. Annular portions (strands) each forming the hexagonal through hole are connected together in a mutually overlapping state. Accordingly, the metal lath has a stepped cross section.

In the power generation cell, a carbon paper sheet formed of conductive fibers is arranged between the surface of each of the electrode layers and the gas flow passage forming member. The carbon paper sheets efficiently diffuse the fuel gas and the oxidant gas to the corresponding electrode layers. When the fuel battery stack is configured by stacking the multiple power generation cells, two separators, which are arranged in an upper portion and a lower portion of each power generation cell, are moved closer to each other in order to cause electric contact between the carbon paper sheets and the gas flow passage forming members. FIG. 49 illustrates a conventional gas flow passage forming member 1021 arranged between a carbon paper sheet 19 bonded to an anode electrode layer 17 and a separator 23. In this state, when the separator 23 is pressed downward, contact portions 1028 of the gas flow passage forming member 1021 are pressed firmly against the carbon paper sheet 19 and bite into the carbon paper sheet 19, as illustrated in FIG. 50.

Accordingly, the contact portions 1028 may cut a portion of the carbon paper sheet 19, thus deteriorating the function of the carbon paper sheet 19 as a gas diffusion layer. Also, a portion of the gas diffusion layer may enter the fuel gas flow passage in the gas flow passage forming member 1021, thus decreasing the effective area of the fuel gas flow passage. This increases pressure loss of the fuel gas, thus decreasing the supply amount of the fuel gas and lowering the power generation efficiency. Further, cut carbon fibers may be carried by the fuel gas and adhere to walls of the narrow gas flow passage in the gas flow passage forming member, thus clogging the passage. This hampers flow of the fuel gas and decreases the power generation efficiency. Also, the amount by which the contact portions 1028 bite into the carbon paper sheet 19 vary among power generation cells. This destabilizes the power generation voltage.

The gas flow passage forming member 1021 has contact portions 1030, which are arranged at the opposite side to the contact portions 1029a. Corners of the contact portions 1030 contact the separator 23, thus damaging the separator 23. Further, in this case, it is difficult to ensure a contact surface area necessary for current carrying between the gas flow passage forming member 1021 and the separator 23. This hampers supply of an electric current from the gas flow passage forming member 1021 to the separator 23, thus lowering the power generation efficiency.

To solve the above-described problem, a metal lath forming device illustrated in FIG. 40 has been employed. With reference to FIG. 40, the metal lath forming device includes a first shearing die 333 having a single shearing edge 333b and a second shearing die 334, which is arranged above the first shearing die 333 and has recesses 334b and projections 334a that are arranged alternately. When a metal lath is formed using the device, the recesses 334b and the projections 334a form upper semi-annular portions and lower semi-annular portions, respectively, in an alternating manner, through a single cycle of descent and ascent of the second shearing die 334. In this case, the lower semi-annular portions formed by the projections 334a are deformed downward so as to cause the upper semi-annular portions formed by the recesses 334b to sag diagonally downward. Each of such sagging portions forms a bent flat surface portion 1029a, as illustrated in FIG. 51. The bent flat surface portion 1029a functions as a contact portion 1029a of the gas flow passage forming member 1021 and is held in surface contact with the gas diffusion layer 19. In this manner, the aforementioned problems caused by biting of the contact portions 1029a are solved. However, since the bent flat surface portion 1029a is formed, the thickness T of the gas flow passage forming member 1021 decreases. This reduces the effective area of the gas flow passage and lowers the power generation efficiency.

PRIOR ART REFERENCE

Patent Document

Patent Document 1: Japanese Laid-Open Patent Publication No. 2007-87768

SUMMARY OF THE INVENTION

Accordingly, an objective of the present invention relates to a gas flow passage forming member capable of preventing a contact portion of the gas flow passage forming member from biting into a gas diffusion layer and thus improving the power generation efficiency of a fuel battery, a method for manufacturing the gas flow passage forming member, a forming device used to manufacture the gas flow passage forming member, a power generation cell for a fuel battery including the gas flow passage forming member, and a method for manufacturing the power generation cell for the fuel battery.

To achieve the foregoing objective and in a accordance with a first aspect of the present invention, a gas flow passage forming member used in a power generation cell of a fuel battery is provide. The power generation cell includes a gas diffusion layer formed in an electrode layer of an electrode structure, and a separator for isolating adjacent power generation cells from each other. The gas flow passage forming member is arranged between the gas diffusion layer and the separator and has a gas flow passage. The power generation cell is configured to generate power through an electrode reaction caused in the electrode layer by supplying fuel gas or oxidant gas to the electrode layer through the gas flow passage. The gas flow passage forming member is configured by a metal lath formed by a thin metal plate. A plurality of through holes are formed in the metal lath in a mesh-like manner. The gas flow passage forming member has a plurality of annular portions forming the through holes. The annular portions each include a flat surface portion in a contact portion between the annular portion and the gas diffusion layer.

In this configuration, the flat surface portion is formed in the contact portion between each of the annular portions of the gas flow passage forming member forming the through holes and the gas diffusion layer such as a carbon paper sheet. The contact portion is thus held in surface contact with the gas diffusion layer. This prevents the contact portion from biting into the gas diffusion layer, thus preventing damage to the gas diffusion layer. Accordingly, fragments of the gas diffusion layer do not enter the gas flow passage of the gas flow passage forming member. This prevents decrease of the effective area of the gas flow passage.

The above gas flow passage forming member preferably includes a flat surface portion in a contact portion between the gas flow passage forming member and the separator.

In the above gas flow passage forming member, the through holes and the annular portions are preferably each formed to have a hexagonal cross section, and each contact portion is preferably located at a position corresponding to one side of the hexagonal shape.

To achieve the foregoing objective and in accordance with a second aspect of the present invention, a method for manufacturing a gas flow passage forming member used in a power generation cell of a fuel battery is provided. The power generation cell includes a gas diffusion layer formed in an electrode layer of an electrode structure, and a separator for isolating adjacent power generation cells from each other. The gas flow passage forming member is arranged between the gas diffusion layer and the separator and has a gas flow passage. The power generation cell is configured to generate power through an electrode reaction caused in the electrode layer by supplying fuel gas or oxidant gas to the electrode layer through the gas flow passage. The method for manufacturing the gas flow passage forming member includes: a first step of manufacturing a metal lath by forming a plurality of through holes in a thin metal plate in a mesh-like manner; and a second step of forming a flat surface portion in a contact portion between each of annular portions forming the through holes of the metal lath and the gas diffusion layer after the first step.

In the above method for manufacturing a gas flow passage forming member, the flat surface portion is preferably formed, in the second step, by arranging and compressing the metal lath obtained in the first step between a pair of rollers to plastically deform the contact portion.

In the above the method for manufacturing a gas flow passage forming member, the formation of the flat surface portion in the second step is preferably carried out by plastically deforming the contact portion in a direction of the thickness of the metal lath using a fixed cutting die and a movable cutting die at the first step in which the metal lath is manufactured.

To achieve the foregoing objective and in accordance with a third aspect of the present invention, a forming device used for manufacturing a gas flow passage forming member is provided. The forming device includes a fixed cutting die having first recesses and first projections alternately arranged at a predetermined pitch, and a movable cutting die having second projections and second recesses that are arranged at a predetermined pitch. The second projections are engaged with the first recesses. The second recesses are engaged with the first projections of the fixed cutting die. The movable cutting die is capable of reciprocating in directions of the thickness and the width of the thin metal plate. A plurality of annular portions defining the through holes are formed in the thin metal plate by forming a plurality of cuts in the thin metal plate at a predetermined pitch and bending and stretching the thin metal plate through engagement between the first recesses and the first projections of the fixed cutting die with the second projections and the second recesses of the movable cutting die. An inclined surface is formed in an upper surface of each of the first projections of the fixed cutting die. The inclined surface is inclined downward toward a downstream side of a feeding direction of the thin metal plate.

To achieve the foregoing objective and in accordance with a fourth aspect of the present invention, a forming device used for manufacturing a gas flow passage forming member is provided. The forming device includes a fixed cutting die having first recesses and first protections alternately arranged at a predetermined pitch, and a movable cutting die having second projections and second recesses that are arranged at a predetermined pitch. The second projections are engaged with the first recesses. The second recesses are engaged with the first projections of the fixed cutting die. The movable cutting die is capable of reciprocating in directions of the thickness and the width of the thin metal plate. A plurality of annular portions defining the through holes are formed in the thin metal plate by forming a plurality of cuts in the thin metal plate at a predetermined pitch and bending and stretching the thin metal plate through engagement between the first recesses and the first projections of the fixed cutting die with the second projections and the second recesses of the movable cutting die. An inclined surface is formed in a lower surface of each of the second projections of the movable cutting die. The inclined surface is inclined upward in an upstream direction opposite to a feeding direction of the thin metal plate.

In the above forming device, the fixed cutting die or the movable cutting die preferably bends, toward the center of the corresponding through hole, two side portions of each annular portion that are located at opposite sides of a contact portion of the annular portion and a gas diffusion layer of the fuel battery.

To achieve the foregoing objective and in accordance with a fourth aspect of present invention, a gas flow passage forming member is provided that includes a gas diffusion layer formed in an electrode layer of an electrode structure and a gas flow passage that is arranged between the gas diffusion layer and a separator to supply fuel gas or oxidant gas. The gas flow passage forming member is configured to generate power through an electrode reaction caused in the electrode layer by supplying the fuel gas or the oxidant gas to the electrode layer through the gas flow passage. The gas flow passage forming member is formed by a metal lath that is configured by forming, in a mesh-like manner, a plurality of annular portions in a thin metal plate. Each annular portion has a through hole. A first flat surface portion is formed in a first contact portion of each of the annular portions that contacts a surface of the gas diffusion layer. A second flat surface portion is formed in a second contact portion of each annular portion that contacts a backside of the separator. A width of the first flat surface portion in the direction of the gas flow passage is set to be greater than a width of the second flat surface portion in the direction of the gas flow passage.

In this configuration, the annular portions forming the through holes are formed in the gas flow passage forming member. The first flat surface portion is formed, through pressing, in the first contact portion contacting the gas diffusion layer such as a carbon paper sheet in the outer periphery of each annular portion. The first flat surface portion is thus held in surface contact with a corresponding surface of the gas diffusion layer. This prevents the first contact portion from biting into the gas diffusion layer, thus preventing damage to the gas diffusion layer. Accordingly, the effective area of the gas flow passage is prevented from being decreased by fragments of the gas diffusion layer entering the gas flow passage of the gas flow passage forming member.

The second flat surface portion is formed, through pressing, in the second contact portion contacting the separator in the outer periphery of each annular portion. The second flat surface portion is thus held in surface contact with the backside of the separator, thus preventing damage to the separator and ensuring a necessary current carrying surface area between the gas flow passage forming member and the separator. This reduces electric resistance caused by power generation and improves the power generation efficiency.

The width of the first flat surface portion is set to a relatively great value in order to prevent the first flat surface portion from biting into the gas diffusion layer. The width of the second flat surface portion is set to be smaller than the width of the first flat surface portion to such an extent that damage to the separator is prevented and that a necessary current carrying surface area is ensured between the second flat surface portion and the separator. This maintains an appropriate thickness of the gas flow passage forming member and allows for an effective area of the gas flow passage in the gas flow passage forming member. If the width of the second flat surface portion was equal to the width of the first flat surface portion, the gas flow passage forming member would be compressed excessively when the first and second flat surface portions are pressed. This would decrease the thickness of the gas flow passage forming member and reduce the size of the gas flow passage.

As above, the gas flow passage forming member is preferably configured such that: joint plate portions connecting the annular portions are formed; a first semi-annular portion facing the gas diffusion layer is arranged in each annular portion; the first semi-annular portion includes a pair of first side plate portions connected to the corresponding joint plate portions, a pair of first inclined plate portions integrated with ends of the first side plate portions, and a first flat plate portion integrated with the first inclined plate portions in such a manner as to connect the first inclined plate portions to each other, the first flat plate portion including a first contact portion contacting the gas diffusion layer, the first flat surface portion being formed in the first contact portion; a second semi-annular portion facing the separator is formed in each annular portion; and the second semi-annular portion includes a pair of second inclined plate portions integrated with the corresponding joint plate portions, a pair of parallel side plate portions integrated with ends of the second inclined plate portions, and a second flat plate portion integrated with the second side plate portions in such a manner as to connect the second side plate portions to each other, the second flat plate portion having a second contact portion contacting the separator, the second flat surface portion being formed in the second contact portion.

To achieve the foregoing objective and in accordance with a fifth aspect of the present invention, a method for manufacturing a gas flow passage forming member is provided. The method includes: a first step of alternately forming, by using a first shearing die and a second shearing die, the first semi-annular portions facing the gas diffusion layer and the second semi-annular portions facing the separator at a plurality of positions of an end of the thin metal plate, wherein the first shearing die has a plurality of first recesses and a plurality of first projections alternately arranged at a predetermined pitch, and the second shearing die has second projections and second recesses that are alternately arranged at a plurality of positions at a predetermined pitch, the second projections corresponding to the first recesses and the second recesses corresponding to the first projections; a second step of alternately forming the first semi-annular portions and the second semi-annular portions at a plurality of positions of the thin metal plate by moving the thin metal plate by a predetermined amount and offsetting the first shearing die and the second shearing die in a direction perpendicular to a feeding direction of the thin metal plate; a third step of obtaining a metal lath by forming a plurality of annular portions each having a through hole in the thin metal plate in a mesh-like manner by means of the first semi-annular portions and the corresponding second semi-annular portions that are arranged adjacently along the feeding direction of the thin metal plate through alternate repetition of a step similar to the first step and a step similar to the second step; and a fourth step of forming a first flat surface portion in the first contact portion of each first semi-annular portion and the second flat surface portion in the second contact portion of each second semi-annular portion by simultaneously pressing two surfaces of the metal lath after the third step, the width of the first flat surface portion in the direction of the gas flow passage being set to be smaller than the width of the second flat surface portion in the direction of the gas flow passage.

To achieve the foregoing objective and in accordance with a sixth aspect of the present invention, a forming device used in a method for manufacturing a gas flow passage forming member is provided. The device includes a first shearing die, a second shearing die, and a pressing machine pressing the metal lath including annular portions in a direction of the thickness of a metal lath. The metal lath is formed by reciprocating the first shearing die and the second shearing die in a direction of the thickness of the thin metal plate and a direction perpendicular to the feeding direction of the thin metal plate, respectively, causing engagement between the first recesses and the second projections and between the first projections and the second recesses, and bending and stretching the thin metal plate after forming a plurality of cuts in the thin metal plate at a predetermined pitch. The first projections, the first recesses, the second recesses, and the second projections are shaped in such a manner that a deformation amount of each first semi-annular portion when pressed and a deformation amount of the corresponding second semi-annular portion when pressed are different, so as to press the semi-annular portions.

In the above forming device, each first projection of the first shearing die and each second recess of the second shearing die each have a forming surface for forming a pair of first side plates forming the first semi-annular portion, a forming surface for forming a pair of first inclined plate portions connected to the first side plates, and a forming surface for forming a first flat plate portion connected to the first inclined plate portions in such a manner as to connect the first inclined plate portions to each other. Also, each first recess of the first shearing die and each second projection of the second shearing die each have a forming surface for forming a pair of second inclined plate portions forming the second semi-annular portion, a forming surface for forming a pair of second side plate portions connected to the first inclined plate portions, and a forming surface for forming the second flat plate portion connected to the second side plate portions in such a manner as to connect the second side plate portions to each other.

To achieve the foregoing objective and in accordance with a seventh aspect of the present invention, a power generation cell for a fuel battery is provided. The cell includes an electrode layer, a gas diffusion layer formed on a surface of the electrode layer, a separator facing the gas diffusion layer, and a gas flow passage forming member that is arranged between the gas diffusion layer and the separator and has a gas flow passage through which fuel gas or oxidant gas is supplied to the electrode layer. The power generating cell generating power through an electrode reaction caused in the electrode layer. The gas flow passage forming member is configured by a metal lath formed by a thin metal plate. A great number of annular portions each having a through hole with a predetermined shape are formed in the gas flow passage forming member in a mesh-like manner. A bent flat surface portion held in surface contact with a surface of the gas diffusion layer is formed in each of the annular portions. A non-bent flat surface portion is formed between the bent flat surface portion and joint plate portions connecting the corresponding annular portions. The bent flat surface portion and the non-bent flat surface portion are formed in a plurality of consecutive steps using a metal lath forming device.

According to the present invention, the bent flat surface portion is formed in the contact portion contacting the gas diffusion layer such as a carbon paper sheet in the outer periphery of each of the annular portions of the gas flow passage forming member forming the through holes. The bent flat surface portion is thus held in surface contact with a corresponding surface of the gas diffusion layer. This prevents the contact portion from biting into the gas diffusion layer, thus preventing damage to the gas diffusion layer. Accordingly, fragments of the damaged gas diffusion layer do not enter the gas flow passage in the gas flow passage forming member. The effective area of the gas flow passage is thus prevented from decreasing.

According to the present invention, the bent flat surface portions and the non-bent flat surface portions are formed through two cycles of metal lath machining. Accordingly, compared to a case in which a wide bent flat surface portion is formed in the entire range of each annular portion in the direction of the width of the annular portion through a single metal lath machining cycle, the width of the bent flat surface portion to be formed is decreased and, correspondingly, the thickness of the gas flow passage forming member is increased. As a result, the effective area of the gas flow passage is increased and the power generation efficiency is improved.

In the power generation cell for a fuel battery according to the present invention, each annular portion is preferably formed in a pentagonal or hexagonal shape.

To achieve the foregoing objective and in accordance with an eighth aspect of the present invention, a method for manufacturing a power generation cell for a fuel battery is provided. The method includes a first step, which includes: sequentially machining, by using a first shearing die and a second shearing die, a plurality of first portions-to-be-machined and a plurality of second portions-to-be-machined that are in the thin metal plate and arranged alternately in a feeding direction of the thin metal plate, the first shearing die having a linear first shearing edge, and the second shearing die having a plurality of recesses and a plurality of projections alternately arranged at a predetermined interval, second shearing edges being formed in the projections to cooperate with the first shearing edge to form a plurality of cuts in the thin metal plate; and forming the semi-annular portions each having the bent flat surface portion in the first portions-to-be-machined of the thin metal plate in a state where each of the first portions-to-be-machined has been moved to an intermediate forming position with respect to the first shearing die and the second shearing die. The method also includes: a second step of forming, after the first step, semi-annular portions each having the non-bent flat surface portion in the first portions-to-be-machined in a state where each first portions-to-be-machined has been moved to a final forming position with respect to the first shearing die and the second shearing die; a third step of forming, after the second step, the semi-annular portions each having the bent flat surface portion in the second portions-to-be-machined by offsetting the second shearing die in a direction perpendicular to the feeding direction of the thin metal plate in a state where each second portion-to-be-machined adjacent to the corresponding first portion-to-be-machined in the thin metal plate from an upstream side of the feeding direction of the thin metal plate has been moved to the intermediate forming position with respect to the first shearing die and the second shearing die; a fourth step of forming, after the third step, the semi-annular portions each having the non-bent flat surface portion in the second portions-to-be-machined in a state where each second portion-to-be-machined has been further moved to the final forming position with respect to the first shearing die and the second shearing die; and a step of forming the metal lath by forming the annular portions in the thin metal plate in a mesh-like manner by alternately repeating the first and second steps and the third and fourth steps.

In the method for manufacturing a power generation cell for a fuel battery according to the present invention, the second step and the fourth step are each preferably carried out a plurality of times.

DETAILED DESCRIPTION OF THE PREFERRED EMBODIMENTS

First Embodiment

An embodiment of a polymer electrolyte fuel battery stack 11 including a gas flow passage forming member according to the present invention will now be described with reference to FIGS. 1 to 21.

Figure 1:
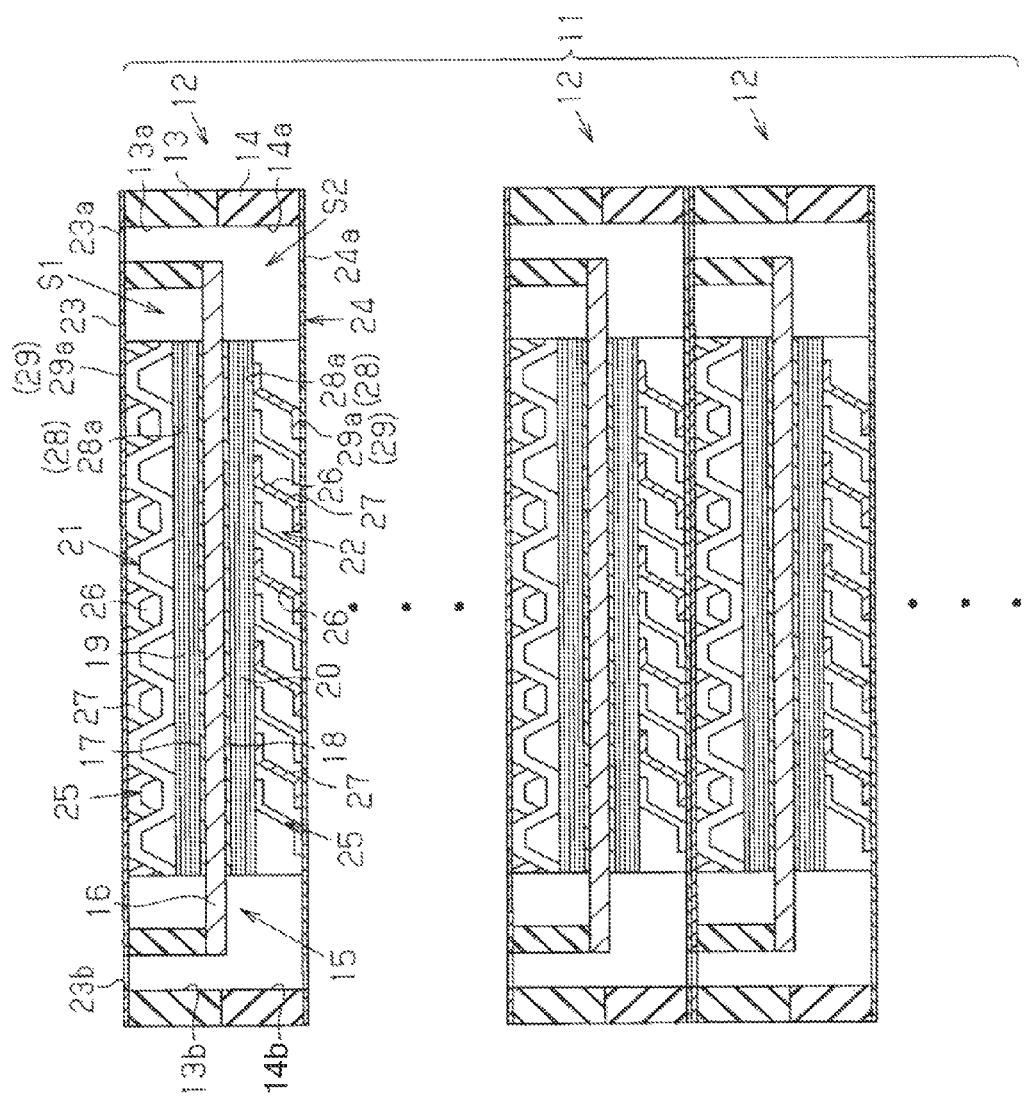
FIG. 1 is a vertical cross-sectional view showing a fuel battery stack formed by power generation cells including a gas flow passage forming member according to the present invention.
Figure 2:
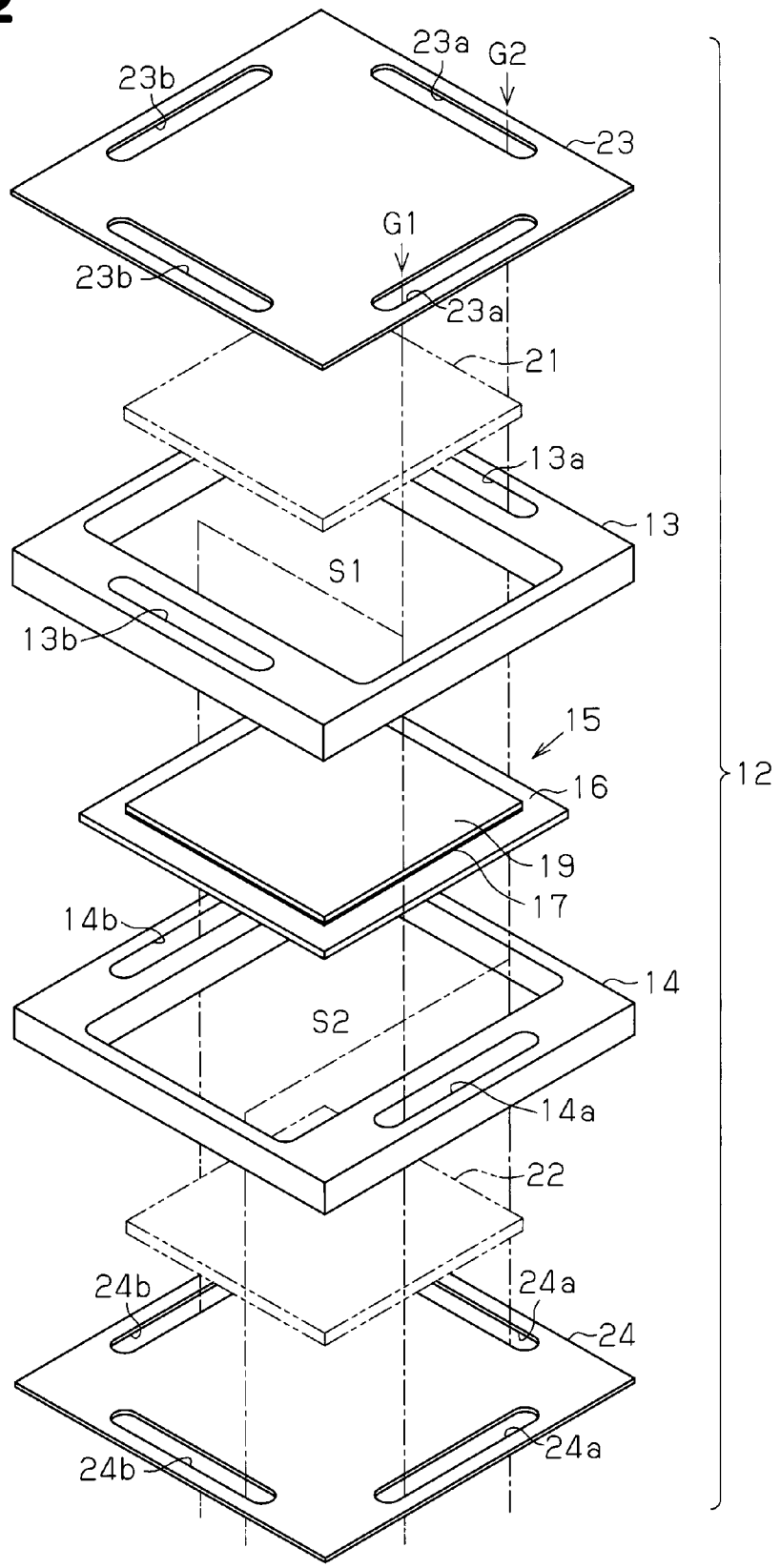
FIG. 2 is an exploded perspective view showing a power generation cell.

As illustrated in FIGS. 1 and 2, the fuel battery stack 11 is formed by stacking a plurality of power generation cells 12. Each of the power generation cells 12 includes a first frame 13, a second frame 14, and an MEA (membrane-electrode assembly) 15 serving as an electrode structure. The first and second frames 13, 14 are each formed of synthetic rubber or synthetic resin and formed into a rectangular frame. The first frame 13 and the second frame 14 have a fuel gas flow passage space S1 and an oxidant gas flow passage space S2, respectively. The MEA 15 is arranged between the frames 13, 14. Each power generation cell 12 also has a first gas flow passage forming member 21 received in the fuel gas flow passage space S1 and a second gas flow passage forming member 22 received in the oxidant gas flow passage space S2. The first and second gas flow passage forming members 21, 22 are both formed of titanium. The power generation cell 12 further includes a first separator 23 and a second separator 24. The first separator 23 is bonded to the upper surface of the first frame 13 and the upper surface of the first gas flow passage forming member 21. The second separator 24 is bonded to the lower surface of the second frame 14 and the lower surface of the second gas flow passage forming member 22. The first and second separators 23, 24 are both formed of titanium and shaped into a flat plate. In FIG. 2, the shapes of the gas flow passage forming members 21, 22 are simplified.

Gas flow passages 13*a*, 13*b*, each formed by an elongated hole, are formed in a pair of opposed edges of the first frame 13. Gas flow passages 14*a*, 14*b*, each formed by an elongated hole, are formed in a pair of opposed edges of the second frame 14. Specifically, the gas flow passages 13*a*, 13*b* are formed in the edges of the first frame 13 that do not correspond to the edges of the second frame 14 in which the gas flow passages 14*a*, 14*b* are formed.

The MEA 15 is configured by an electrode membrane 16, an anode electrode layer 17, a cathode electrode layer 18, and carbon paper sheets 19, 20 each serving as a conductive gas diffusion layer. The anode electrode layer 17 is formed by stacking a predetermined catalyst on the upper surface of the electrode membrane 16. The cathode electrode layer 18 is formed by stacking a predetermined catalyst on the lower surface of the electrode membrane 16. The carbon paper sheet 19 is bonded to the corresponding surface of the anode electrode layer 17 and the carbon paper sheet 20 is bonded to the corresponding surface of the cathode electrode layer 18. Gas inlet ports 23*a* are formed in a pair of edges of the first separator 23 that extend perpendicular to each other. Gas outlet ports 23*b* are formed in the other pair of edges of the first separator 23, which extend perpendicular to each other. Similarly, gas inlet ports 24*a* are formed in a pair of edges of the second separator 24 that extend perpendicular to each other. Gas outlet ports 24*b* are formed in the other pair of edges of the second separator 24, which extend perpendicularly to each other.

Figure 3:
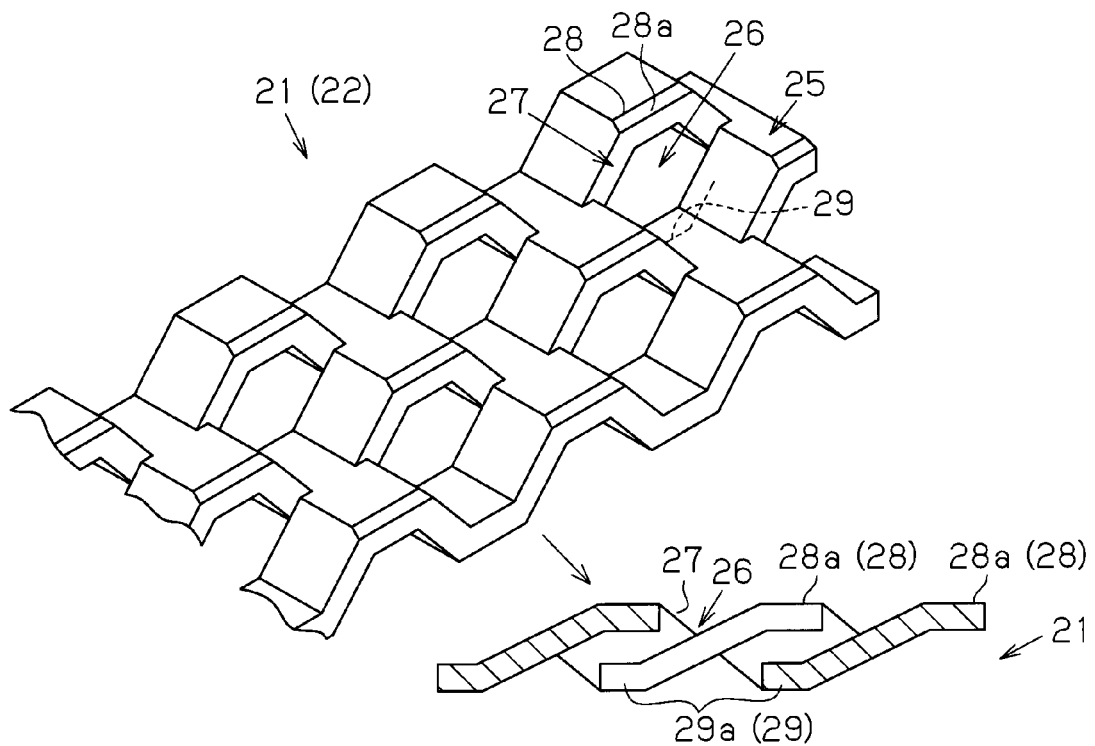
FIG. 3 is a perspective view showing a portion of a first gas flow passage forming member according to a first embodiment of the present invention, with a partial cross-sectional view.

As illustrated in FIG. 3, the first and second gas flow passage forming members 21, 22 are each formed by a titanium member shaped into a lath 25 (hereinafter, referred to simply as a metal lath), which has a thickness of approximately 0.1 mm. Substantially hexagonal through holes 26 are formed in the metal lath 25 in a staggered manner. Annular portions 27, which form the through holes 26, are connected together in a mutually overlapped state. Each of the annular portions 27 has a first contact portion 28 contacting the carbon paper sheet 19, 20 and a second contact portion 29 contacting the inner surface of the first or second separator 23, 24. A first flat surface portion 28*a* and a second flat surface portion 29*a* are formed in the first contact portion 28 and the second contact portion 29, respectively. The first flat surface portion 28*a* is held in surface contact with the carbon paper sheet 19, 20 and the second flat surface portion 29*a* is held in surface contact with the separator 23, 24.

The first gas flow passage forming member 21 is arranged in the fuel gas flow passage space S1 of the first frame 13 in such a manner as to contact the corresponding surface of the carbon paper sheet 19 and the inner surface of the first separator 23. The second gas flow passage forming member 22 is arranged in the oxidant gas flow passage space S2 of the second frame 14 in such a manner as to contact the corresponding surface of the carbon paper sheet 20 and the inner surface of the second separator 24.

As indicated by arrow G1 in FIG. 2, the first gas flow passage forming member 21 introduces fuel gas from the first gas inlet port 23*a* of the first separator 23 into the fuel gas flow passage space S1. The fuel gas then flows to the first gas outlet ports 23*b* or the gas flow passage 14*b* of the second frame 14 and the corresponding first gas outlet port 24*b* of the second separator 24. As indicated by arrow G2 in FIG. 2, the second gas flow passage forming member 22 introduces oxidant gas from the second gas inlet port 23*a* of the first separator 23 into the oxidant gas flow passage space S2 via the gas flow passage 13*a* of the first frame 13. The oxidant gas then flows to the second gas outlet port 23*b* via the gas flow passage 13*b* of the first frame 13 or the second gas outlet port 24*b* of the second separator 24.

In order to ensure the sealing performance in a contact surface between the first frame 13 and the electrode membrane 16 and the second frame 14, the first and second frames 13, 14 are each molded from synthetic resin. Accordingly, when the fuel battery stack 11 is configured by stacking the power generation cells 12, the load produced by fastening the fuel battery stack 11 causes the first and second gas flow passage forming members 21, 22 to be assembled together in states pressed against the MEA 15 by the corresponding first and second separators 23, 24. This maintains an appropriate contact state between the first flat surface portions 28*a* of the first contact portions 28 and the carbon paper sheet 19 and an appropriate contact state between the second flat surface portions 29*a* of the second contact portions 29 and the first separator 23. Since the second gas flow passage forming member 22 is configured in the same manner as the gas flow passage forming member 21, an appropriate contact state is maintained both between the first flat surface portions 28*a* of the first contact portions 28 and the carbon paper sheet 20 and between the second flat surface portions 29*a* of the second contact portions 29 and the second separator 24.

Between each adjacent pair of the stacked power generation cells 12, the first gas inlet ports 23*a* of the first separator 23 communicate with the corresponding first gas inlet ports 24*a* of the second separator 24 through the fuel gas flow passage space S1 of the first frame 13 and the gas flow passage 14*a* of the second frame 14. In this manner, a fuel gas flow passage (a hydrogen gas flow passage) is formed. The second gas inlet ports 23*a* of the first separator 23 communicate with the corresponding second gas inlet ports 24*a* of the second separator 24 through the gas flow passage 13*a* of the first frame 13 and the oxidant gas flow passage space S2 of the second frame 14. In this manner, an oxidant gas flow passage (an air flow passage) is formed.

The first gas flow passage forming member 21 causes the fuel gas in the fuel gas flow passage to flow in the fuel gas flow passage space S1 in a uniformly diffused state. The second gas flow passage forming member 22 causes the oxidant gas in the oxidant gas flow passage space S2 to flow in the oxidant gas flow passage space S2 in a uniformly diffused state. In other words, the stream of the fuel gas in the fuel gas flow passage space S1 passes through the through holes 26, which are formed in the first gas flow passage forming member 21 in a staggered manner, thus causing turbulence. As a result, the fuel gas is uniformly diffused in the gas flow passage space S1. In this manner, the fuel gas is diffused by passing through the carbon paper sheet 19 and supplied uniformly to the anode electrode layer 17.

Similarly, the stream of the oxidant gas in the oxidant gas flow passage space S2 passes through the through holes 26 formed in the second gas flow passage forming member 22 in a staggered manner, thus causing turbulence. As a result, the oxidant gas is uniformly diffused in the oxidant gas flow passage space S2. In this manner, the oxidant gas is diffused by passing through the carbon paper sheet 20 and supplied uniformly to the cathode electrode layer 18. Through such supply of the fuel gas and the oxidant gas to the MEA 15, an electrode reaction is caused in the MEA 15 and the power is generated. Since the multiple power generation cells 12 are stacked in the fuel battery stack 11, the desired output is obtained.

A method for manufacturing the first and second gas flow passage forming members 21, 22 will hereafter be described.

Figure 4:
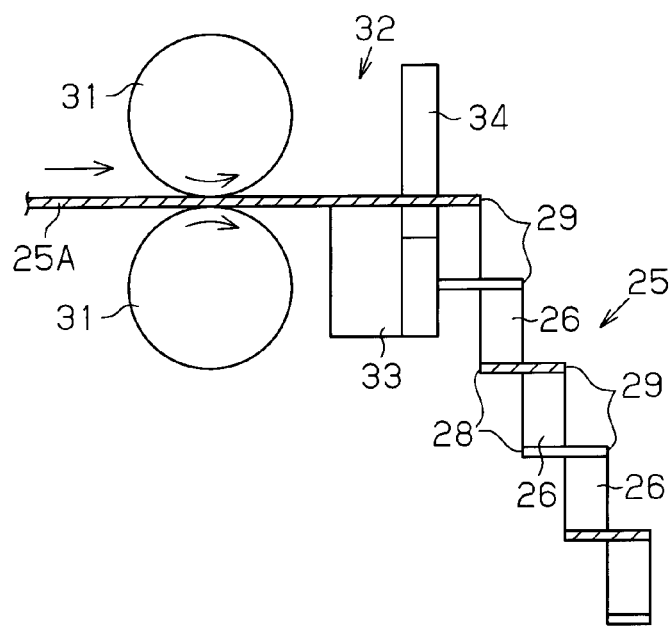
FIG. 4 is a cross-sectional view showing a metal lath machining device.

The first gas flow passage forming member 21 is formed using the metal lath machining device illustrated in FIG. 4. The metal lath machining device includes a pair of feed rollers 31, which continuously supplies thin titanium plates 25A. The metal lath machining device includes a forming mechanism 32 for forming the metal lath 25. The forming mechanism 32 forms a plurality of cuts in a thin titanium plate 25A and plastically deforms the thin titanium plate 25A through bending and stretching. The forming mechanism 32 forms the multiple hexagonal through holes 26 in the thin titanium plate 25A in a mesh-like manner and forms the thin titanium plate 25A in a stepped shape. The forming mechanism 32 has a fixed cutting die 33 fixed immovably at a predetermined position and a movable cutting die 34 capable of reciprocating in upward, downward, leftward, and rightward directions.

Figure 5:
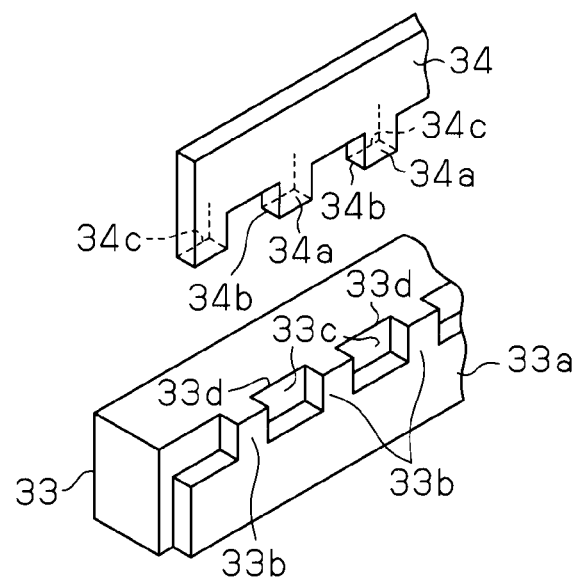
FIG. 5 is a partial perspective view showing a fixed cutting die and a movable cutting die.

As illustrated in FIG. 5, the fixed cutting die 33 has a side wall 33a, which is located at a position toward a downstream side of the feeding direction of each thin titanium plate 25A. A plurality of projections 33b (first projections) and a plurality of recesses 33c (first recesses) are formed in an upper portion of the side wall 33a. The projections 33b and the recesses 33c are alternately arranged at a predetermined lateral pitch. A plurality of projections 34a (second projections) engaged with the corresponding recesses 33c of the fixed cutting die 33 and a plurality of recesses 34b (second recesses) engaged with the corresponding projections 33b of the fixed cutting die 33 are formed in a lower portion of the movable cutting die 34. The projections 34a and the recesses 34b are alternately arranged at a predetermined lateral pitch. The fixed cutting die 33 has shearing edges 33d, each of which is formed at the upper end of the inner surface of the associated one of the recesses 33c and forms a cut in the thin titanium plate 25A. The movable cutting die 34 has shearing edges 34c, each of which is formed at the lower end of the associated one of the projections 34a to form a cut in the thin titanium plate 25A.

Figure 6:
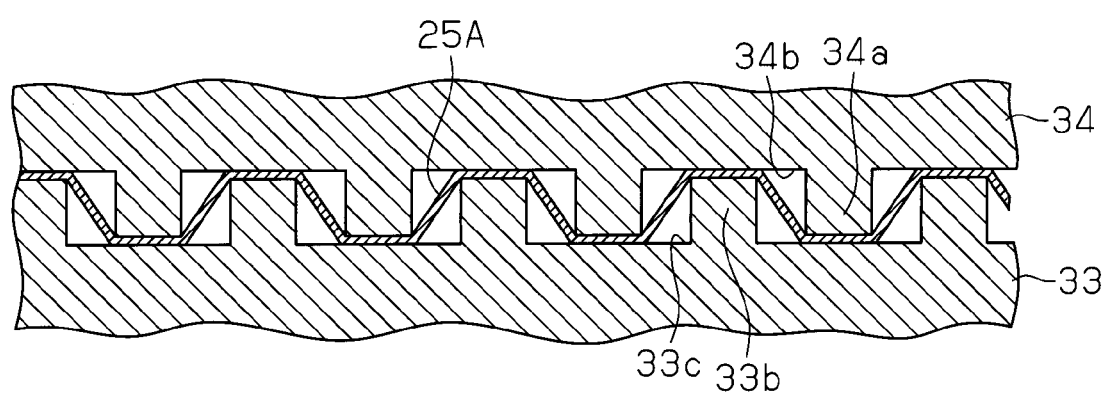
FIG. 6 is a partial cross-sectional view showing the metal lath machining device with the fixed cutting die and the movable cutting die engaged with each other.

As illustrated in FIG. 4, the feed rollers 31 move a thin titanium plate 25A from the fixed cutting die 33 to the movable cutting die 34 by predetermined machining pitches. In this state, the shearing edges 33d of the fixed cutting die 33 and the shearing edges 34c of the movable cutting die 34, which descends for the shearing edges to shear a portion of the thin titanium plate 25A to form a plurality of cuts in the thin titanium plate 25A. The movable cutting die 34 continuously descends to a lowermost position and depresses the thin titanium plate 25A thereby bending and stretching the plate 25A by means of the projections 34a of the movable cutting die 34. Through such bending and stretching of a portion of the thin titanium plate 25A, the thin titanium plate 25A is formed substantially in a trapezoidal shape as illustrated in FIG. 6. Afterwards, the movable cutting die 34 moves upward from the lowermost position and returns to the original position.

Then, the feed rollers 31 move the thin titanium plate 25A to the forming mechanism 32 again by a predetermined pitch. Synchronously, the movable cutting die 34 moves leftward or rightward by the distance corresponding to the half the alignment pitch of the annular portions 27. The movable cutting die 34 then re-descends to form cuts in the thin titanium plate 25A at positions offset leftward or rightward from the previously machined bent-stretched portion by the half pitch and bent-stretches the thin titanium plate 25A. In this manner, by forming the multiple through holes 26 in the thin titanium plate 25A, and bending and stretching the thin titanium plate 25A, the metal lath 25 is completed.

Figure 7:
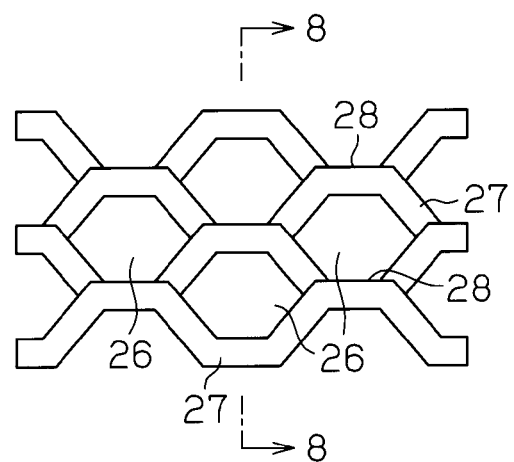
FIG. 7 is a plan view showing a portion of a metal lath.
Figure 8:
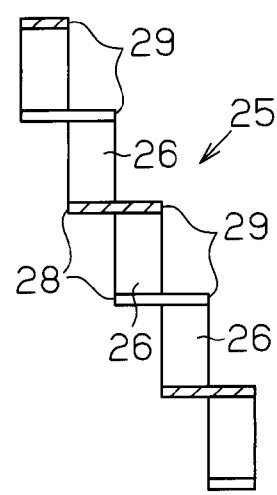
FIG. 8 is a cross-sectional view taken along line 8-8 of FIG. 7.
Figure 9:
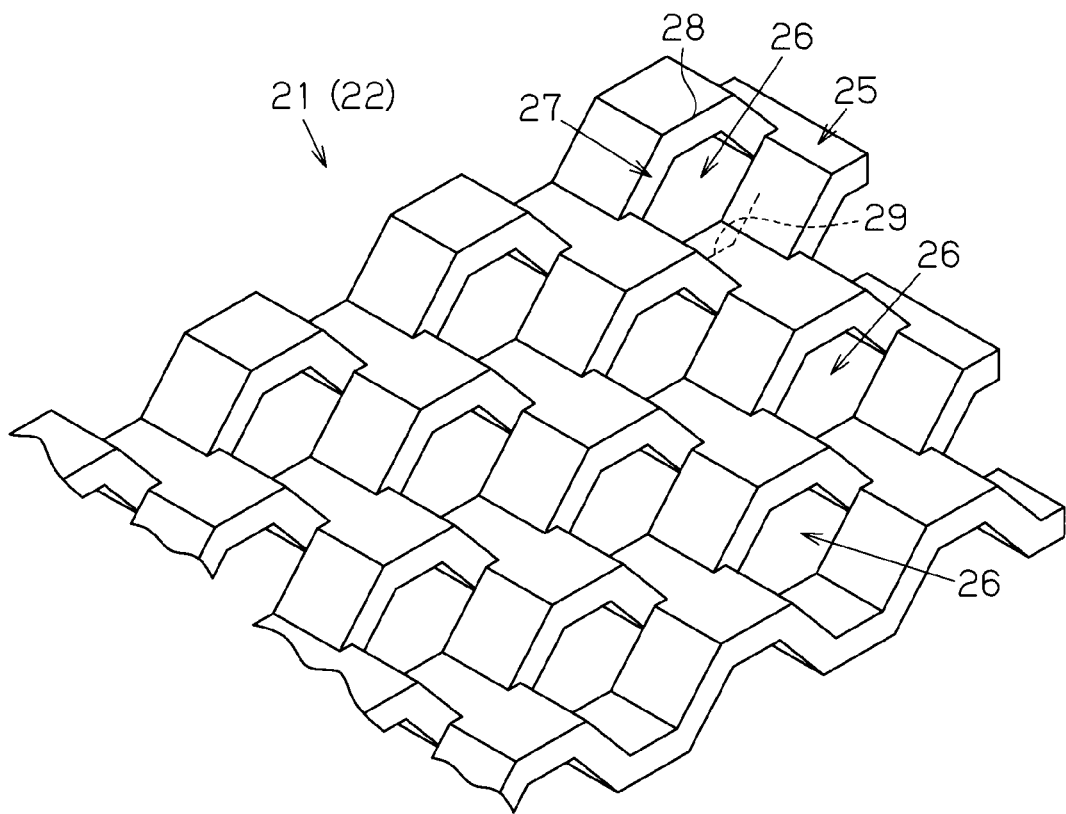
FIG. 9 is a perspective view showing a portion of a metal lath before a flat surface portion is formed.

By repeating the above-described operation, the through holes 26 are formed in the metal lath 25 in a mesh-like and staggered manner as illustrated in FIGS. 7 to 9. Although the projections 33b and the recesses 33c of the fixed cutting die 33 are engaged with the projections 34a and the recesses 34b of the movable cutting die 34, non-machined portions free from machining by the descending movable cutting die 34 exist in the metal lath 25. Through the non-machined portions, the annular portions 27 are connected together in a mutually overlapping state. In this manner, the metal lath 25 having the stepped cross section as illustrated in FIGS. 8 and 9 is formed.

A method for forming the first flat surface portion 28a and the second flat surface portion 29a in each first contact portion 28 and each second contact portion 29, respectively, will hereafter be described.

Figure 10:
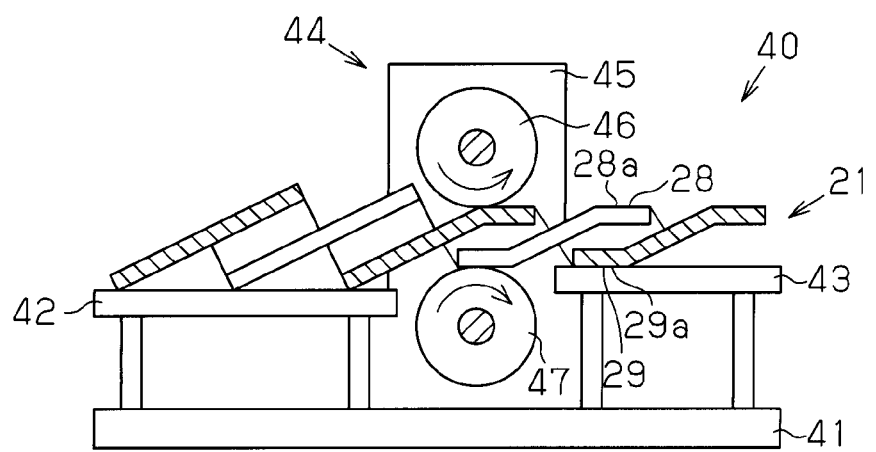
FIG. 10 is a schematic diagram showing a flat surface portion forming device.

As illustrated in FIG. 10, a flat surface portion forming device 40 includes a pair of tables 42, 43, which support the metal lath 25 on the top surface of a bed 41. A flat surface portion forming mechanism 44 is mounted on the bed 41. The flat surface portion forming mechanism 44 has a column 45, a non-illustrated motor attached to the column 45, and a pair of compression rollers 46, 47 rotated by the motor.

To form the flat surface portions 28a, 29a in the first and second contact portions 28, 29 of the metal lath 25, the metal lath 25 is sent from the table 42 to the position between the compression rollers 46, 47, which rotate as indicated by arrows. The two compression rollers 46, 47 then compress the upper surface and the lower surface of the metal lath 25 and move the metal lath 25 rightward as viewed in FIG. 10. This operation compresses the first and second contact portions 28, 29 of the metal lath 25 from above and below each by a predetermined amount. In this manner, the first and second contact portions 28, 29 are plastically deformed so that the first flat surface portions 28a are formed in the first contact portions 28 and the second flat surface portions 29a are formed in the second contact portion 29. Afterwards, the metal lath 25 is cut in accordance with a predetermined size, and the first and second gas flow passage forming members 21, 22 are formed.

Figure 11:
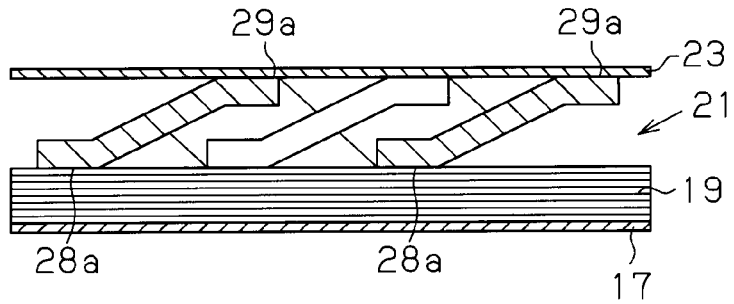
FIG. 11 is a partial cross-sectional view showing a state in which a carbon paper sheet, a first gas flow passage forming member, and a first separator are stacked together.

As illustrated in FIG. 11, the first gas flow passage forming member 21 is incorporated in each power generation cell 12 illustrated in FIG. 1 with the first flat surface portions 28a held in surface contact with the upper surface of the carbon paper sheet 19 and the second flat surface portions 29a held in surface contact with the backside of the first separator 23.

The first embodiment has the advantages described below.

(1) The first gas flow passage forming member 21, which is received in the fuel gas flow passage space S1 of the first frame 13, is formed by the metal lath 25. The second gas flow passage forming member 22, which is accommodated in the oxidant gas flow passage space S2 of the second frame 14, is also formed by the metal lath 25. The first flat surface portion 28a is formed in the first contact portion 28, which contacts the carbon paper sheet 19, of each annular portion 27 forming the through hole 26 of the metal lath 25. This allows for surface contact between the first contact portions 28 and the carbon paper sheet 19, which is formed of fibers. The first contact portions 28 are thus prevented from biting into the surface of the carbon paper sheet 19. Accordingly, the carbon paper sheet 19 and the carbon paper sheet 20 are prevented from entering the fuel gas flow passage of the first gas flow passage forming member 21 and the oxidant gas flow passage of the second gas flow passage forming member 22, respectively. This prevents decrease of the effective areas of the fuel gas flow passage space S1 and the oxidant gas flow passage space S2. As a result, the supply amounts of the fuel gas and the oxidant gas are prevented from decreasing, and lowering of power generation efficiency is avoided.

Further, compared to a case in which the first and second contact portions 28, 29 linearly contact the carbon paper sheets 19, 20, the carbon paper sheets 19, 20 are electrically connected with the corresponding first and second gas flow passage forming members 21, 22 in a reliable manner. This allows for smooth current carrying from the carbon paper sheets 19, 20 to the first and second gas flow passage forming members 21, 22. Also, the carbon paper sheets 19, 20 are prevented from being damaged by the first and second contact portions 28, 29. This prevents clogging of the gas flow passages in the gas flow passage forming members 21, 22 caused by broken carbon fibers. The power generating performance is thus ensured.

(2) The second flat surface portion 29a is formed in each second contact portion 29 of the first and second gas flow passage forming members 21, 22. This allows for surface contact between the second flat surface portions 29a and the first and second separators 23, 24. Accordingly, compared to a case in which the second contact portions 29 linearly contact the first and second separators 23, 24, the first and second gas flow passage forming members 21, 22 are connected electrically with the first and second separators 23, 24 in a reliable manner. This allows for smooth current carrying from the gas flow passage forming members 21, 22 to the separators 23, 24, thus improving the current collecting efficiency. Also, the separators 23, 24 are prevented from being damaged by the second contact portions 29.

(3) The flat surface portion forming device 40 has the two rollers 46, 47, which are illustrated in FIG. 10. Use of these rollers 46, 47 facilitates formation of the flat surface portions 28a, 29a in the first and second contact portions 28, 29 of the metal lath 25.

The first embodiment may be modified as follows.

Figure 12:
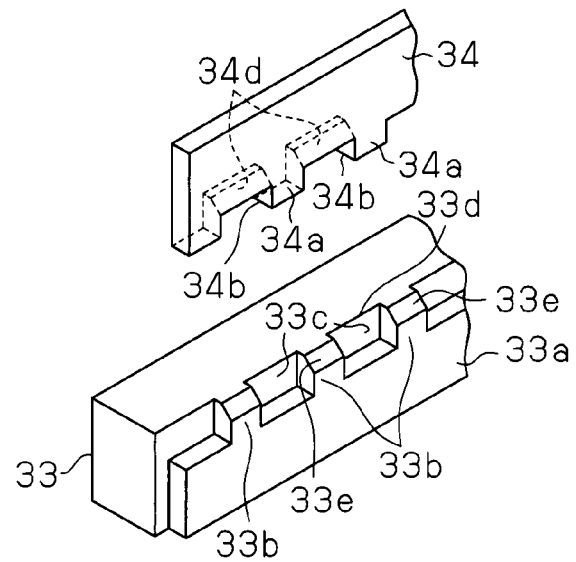
FIG. 12 is a partial perspective view showing a fixed cutting die and a portion of a movable cutting die according to another embodiment.
Figure 13:
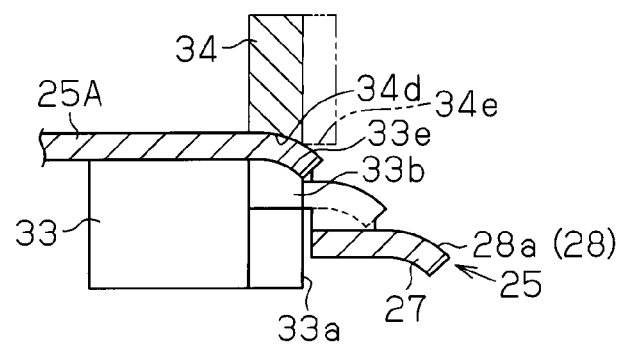
FIG. 13 is a cross-sectional view illustrating a method for forming a flat surface portion in a metal lath using the fixed cutting die and the movable cutting die illustrated in FIG. 12.
Figure 14:
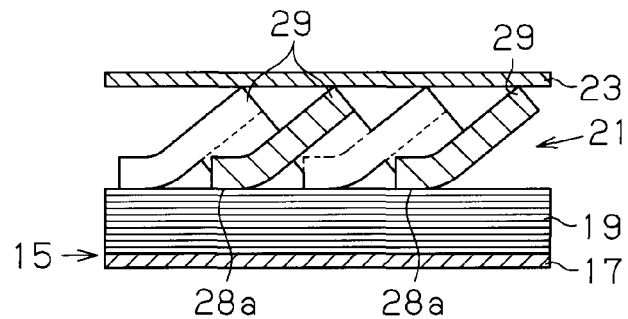
FIG. 14 is a partial cross-sectional view showing a state in which a carbon paper sheet, a first gas flow passage forming member, and a first separator are stacked together.

The configuration of the fixed cutting die 33 of the forming mechanism 32 may be changed as illustrated in FIGS. 12 to 14. In this case, inclined surfaces 33e are formed in the top surfaces of the projections 33b of the fixed cutting die 33. The inclined surfaces 33e are inclined downward toward the downstream side of the feeding direction of the thin titanium plate 25A. Similarly, inclined surfaces 34d are formed in the inner surfaces of the recesses 34b of the movable cutting die 34. Like the inclined surfaces 33e, the inclined surfaces 34d are inclined downward toward the downstream side of the feeding direction of the thin titanium plate 25A. When the metal lath 25 is machined by the fixed cutting die 33 and the movable cutting die 34, the inclined surfaces 33e, 34d form bent portions in the first contact portions 28 of the annular portions 27. A surface of each bent portion forms the first flat surface portion 28a. In this case, the first flat surface portions 28a are formed only in the first contact portions 28, which contact the carbon paper sheet 19. Alternatively, as indicated by the double-dotted chain lines in FIG. 13, the thickness of the movable cutting die 34 may be increased in such a manner that flat portions 34e, each extending horizontally from the corresponding inclined surface 34d, are formed in the movable cutting die 34. This increases the rigidity of the movable cutting die 34.

The thus manufactured first gas flow passage forming member 21 is incorporated in each power generation cell 12 with the first flat surface portions 28a of the first contact portions 28 held in surface contact with the carbon paper sheet 19 of the MEA 15.

Figure 15:
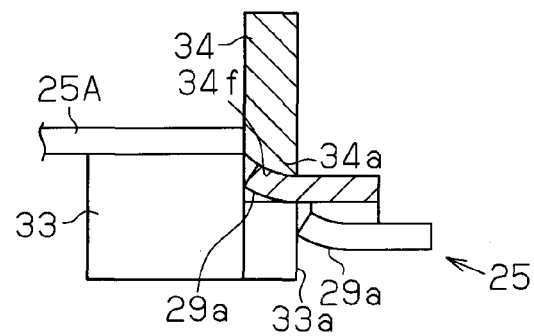
FIG. 15 is a partial cross-sectional view showing a flat surface portion forming device according to another embodiment of the invention.

As illustrated in FIG. 15, inclined surfaces 34f, which are inclined upward toward the upstream side of the feeding direction of the thin titanium plate 25A, may be formed in the lower surfaces of the projections 34a of the movable cutting die 34. In this case, the flat surface portions 29a are formed in the second contact portions 29.

The configuration illustrated in FIG. 12 and the configuration illustrated in FIG. 15 may be used in combination. In this case, both of the first flat surface portions 28a and the second flat surface portions 29a are formed on the contact portion 28 and the contact portion 29, respectively, in the gas flow passage forming member 21.

Figure 16:
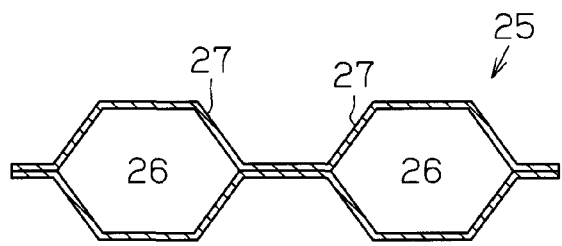
FIG. 16 is a cross-sectional view showing a metal lath before a flat surface portion is formed.
Figure 17:
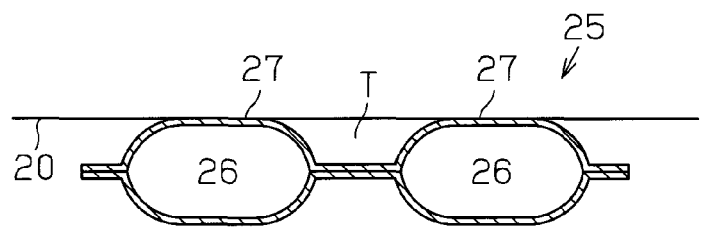
FIG. 17 is a cross-sectional view showing the metal lath after the flat surface portion is formed.
Figure 18:
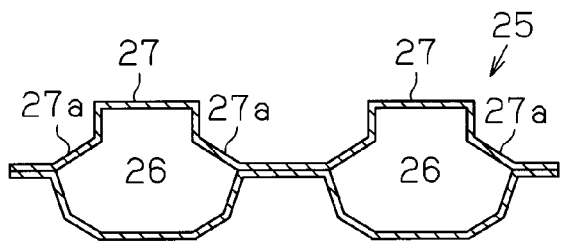
FIG. 18 is a cross-sectional view showing a metal lath before a flat surface portion is formed.
Figure 19:
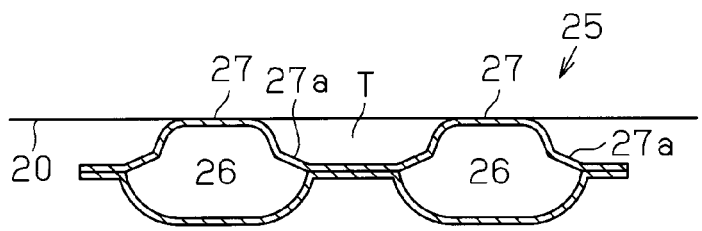
FIG. 19 is a cross-sectional view showing the metal lath after the flat surface portion is formed.

If flat surface portions are formed in the metal lath 25 illustrated in FIG. 16, which is formed by the hexagonal annular portions 27 each forming the through hole 26, using the flat surface portion forming device 40 shown in FIG. 10, two sides of each hexagonal annular portion 27 that are located at opposed sides of the contact portion between the annular portion 27 and the carbon paper sheet 20 are expanded outwards, with respect to FIG. 17. This may decrease the effective area of a gas flow passage T surrounded by the carbon paper sheet 20 and the metal lath 25. To solve this problem, the sides of each hexagonal annular portion 27 may be bent toward the center of the through hole 26, as illustrated in FIG. 18, in such a manner as to form substantially L-shaped or arcuate bent portions 27a. If the metal lath 25 is shaped as illustrated in FIG. 18 and then subjected to the operation of the flat surface portion forming device 40, the area of each through hole 26 is reduced but the effective area of the gas flow passage T is increased, with reference to FIG. 19. This improves the power generation efficiency of the fuel battery.

Figure 20A:
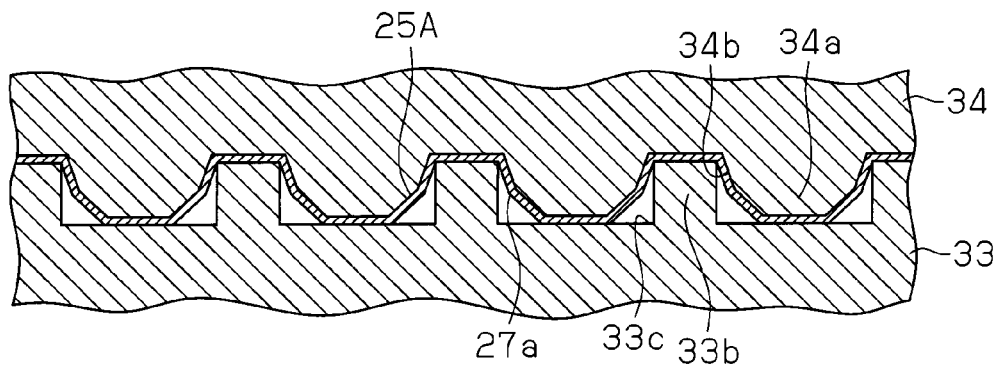
FIGS. 20(a) and 20(b) are partial cross-sectional views each showing a metal lath machining device according to another embodiment of the invention.
Figure 20B:
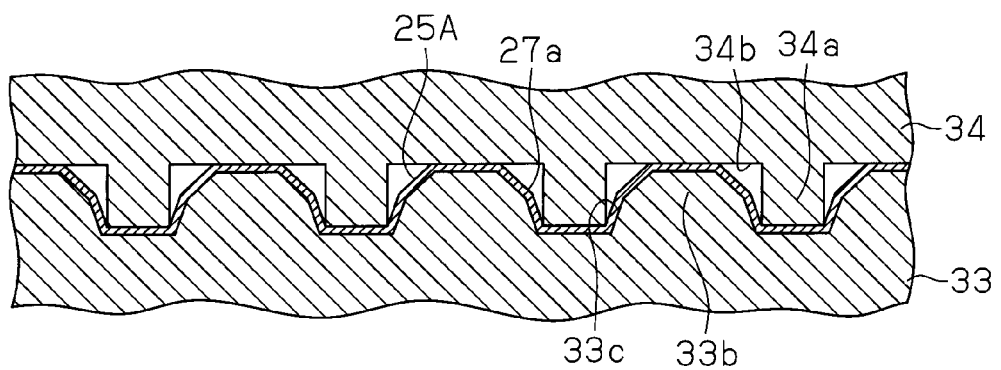

With reference to FIG. 20(a), for example, both sides of each projection 34a and both sides of each recess 34b of the movable cutting die 34 may be changed to inclined surfaces in order to form the bent portions 27a in the annular portions 27. Alternatively, as illustrated in FIG. 20(b), both sides of each projection 33b and both sides of each recess 33c of the fixed cutting die 33 may be changed to inclined surfaces.

The flat surface portions 28a, 29a may be formed in the first and second gas flow passage forming members 21, 22 by compressing the metal lath 25 by a predetermined amount in the direction of the thickness of the metal lath 25 using a pressing machine. The first contact portions 28 and the second contact portions 29 may be formed using a grinding machine or through mechanical machining.

Other than the stainless steel plates, conductive metal plates formed of, for example, aluminum, copper, or titanium, may be employed as the materials of the first and second gas flow passage forming members 21, 22.

Figure 21:
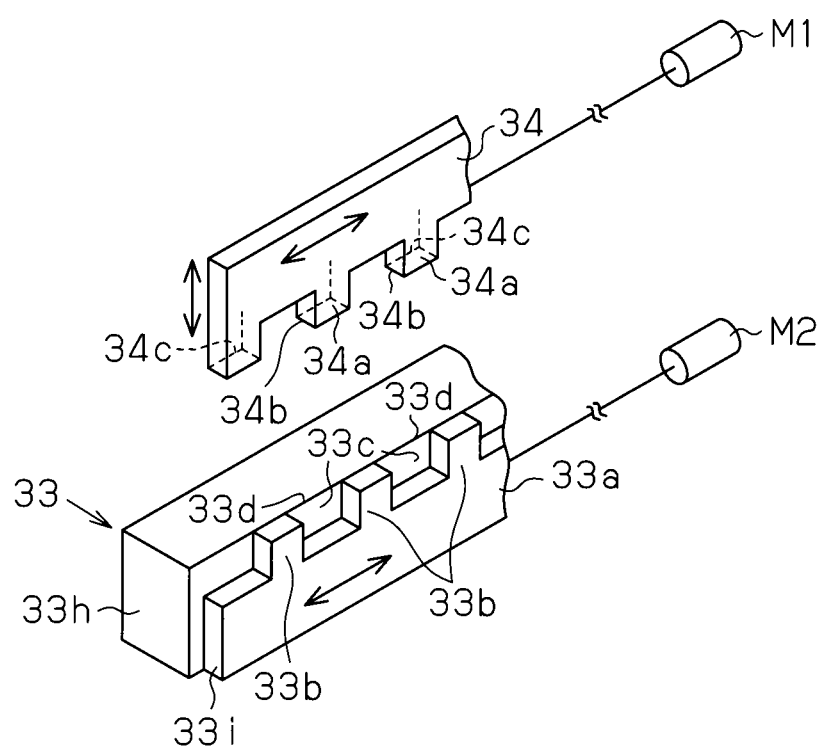
FIG. 21 is a perspective view showing a fixed cutting die according to another embodiment of the invention.

With reference to FIG. 21, the fixed cutting die 33 may be configured by a die 33h and a lower movable cutting die 33i, which are separate bodies. In this case, the upper movable cutting die 34 is reciprocated in upward, downward, leftward, and rightward directions through operation of a non-illustrated lift mechanism or a servomotor M1. The die 33*h* is fixed at a predetermined position. The lower movable cutting die 33*i* is reciprocated in leftward and rightward directions through operation of a servomotor M2. The fixed die 33 may be configured by a die and a lower movable cutting die, which are separate bodies, as in the configuration illustrated in FIG. 21.

Second Embodiment

A second embodiment of the present invention will now be described with reference to FIGS. 22 to 34. Detailed description of components of the second embodiment that are like or the same as corresponding components of the first embodiment will be omitted herein.

Figure 23:
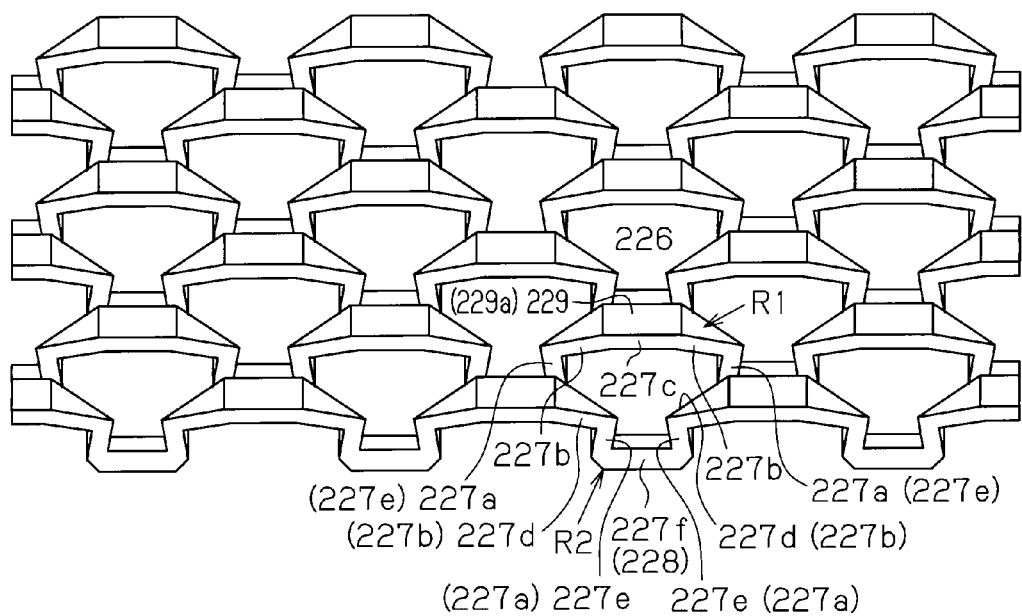
FIG. 23 is a partial front view showing the gas flow passage forming member.

With reference to FIG. 23, a semi-annular portion R1 (a first semi-annular portion) contacting the gas diffusion layer 19 is arranged in an upper portion of an annular portion 227. The semi-annular portion R1 is configured by a pair of first side plate portions 227*a*, a pair of first inclined plate portions 227*b*, and a first flat plate portion 227*c*. The first inclined plate portions 227*b* are integrated with the upper ends of the corresponding side plate portions 227*a*. The first flat plate portion 227*c* is integrated with the distal ends of the first inclined plate portions 227*b* in such a manner as to connect the distal ends of the first inclined plate portions 227*b* to each other. A semi-annular portion R2 (a second semi-annular portion) contacting the separator 23 is arranged in a lower portion of each annular portion 227. The semi-annular portion R2 is configured by a pair of second inclined plate portions 227*d*, a pair of second side plate portions 227*e*, and a second flat plate portion 227*f*. The second side plate portions 227*e* extend downward from the distal ends of the corresponding second inclined plate portions 227*d*. The second flat plate portion 227*f* is integrated with the distal ends of the side plate portions 227*e* in such a manner as to connect the distal ends of the side plate portions 227*e* to each other.

Figure 22:
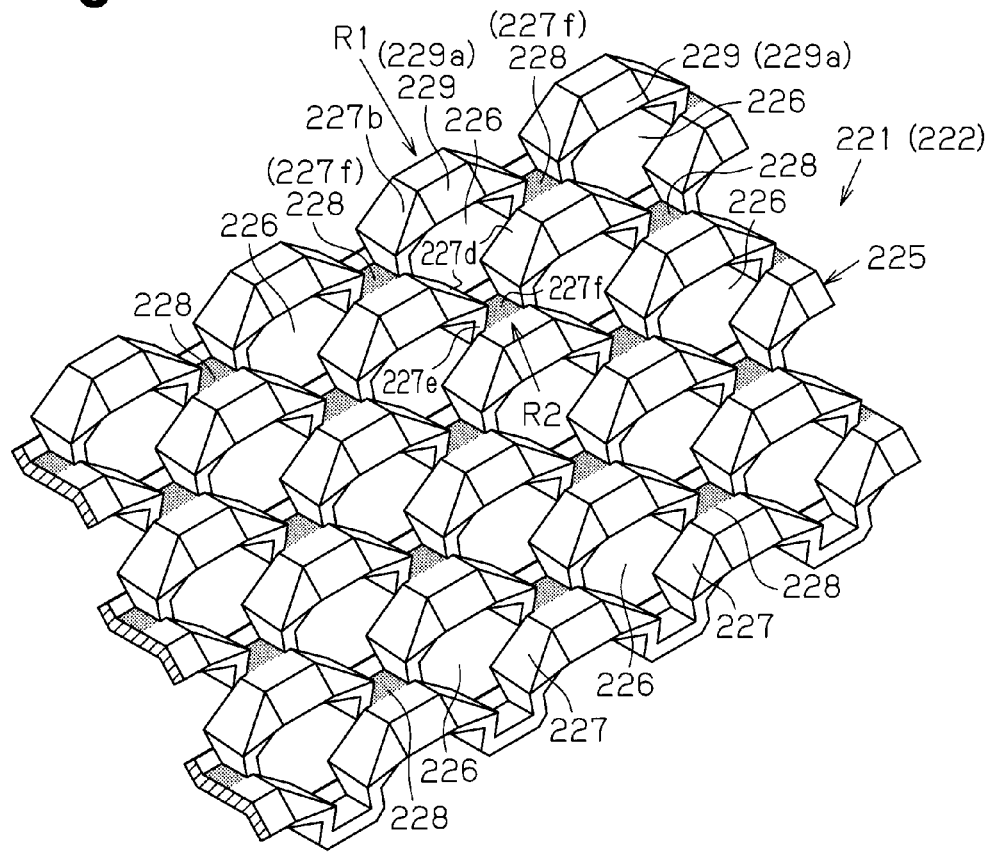
FIG. 22 is a partial perspective view showing a gas flow passage forming member according to a second embodiment of the invention.
Figure 24:
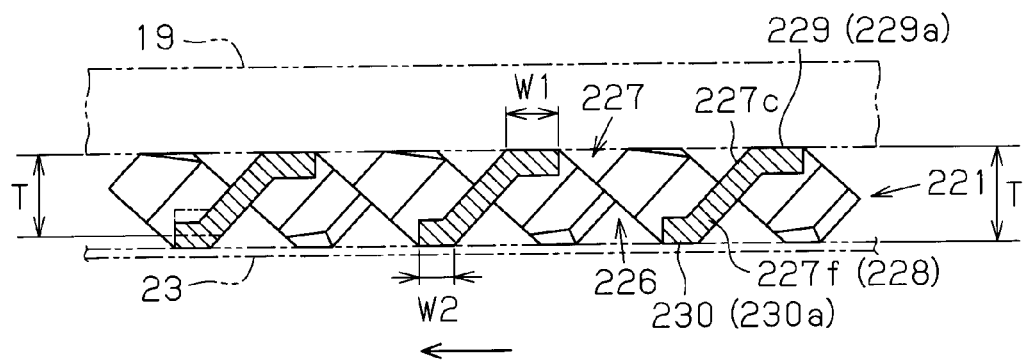
FIG. 24 is a partial cross-sectional view showing the gas flow passage forming member.

With reference to FIG. 22, a joint plate portion 228 corresponds to the second flat plate portion 227*f* forming each semi-annular portion R2. The first flat plate portion 227*c* of each semi-annular portion R1 has an end at the opposite side to the joint plate portion 228 (the second flat plate portion 227*f*). This end is a first contact portion 229, which contacts a surface of the gas diffusion layer 19 (or 20). The second flat plate portion 227*f* (the joint plate portion 228) of each semi-annular portion R2 has an end at the opposite side to the first flat plate portion 227*c*. This end is a second contact portion 230, which contacts the inner surface of the first or second separator 23, 24, as illustrated in FIG. 24. A first flat surface portion 229*a* and a second flat surface portion 230*a* are formed in the first contact portion 229 and the second contact portion 230, respectively. The first and second flat surface portions 229*a*, 230*a* are formed by simultaneously compressing two surfaces of the metal lath 225 in the direction of the thickness of the metal lath 225. The first flat surface portion 229*a* and the second flat surface portion 230*a* are formed parallel to each other.

The first flat surface portion 229*a* is held in surface contact with the gas diffusion layer 19 (20). The second flat surface portion 230*a* is held in surface contact with the separator 23 (24). The first flat surface portion 229*a* has a width W1 in the direction of the gas flow passage (the direction indicated by the arrow in FIG. 24). The width W1 is set to, for example, 0.2 mm. The second flat surface portion 230*a* has a width W2 in the direction of the gas flow passage. The width W2 is set to, for example, 0.1 mm. The width W1 is set to be greater than the width W2.

A method for manufacturing the first and second gas flow passage forming members 221, 222 will hereafter be described.

A forming mechanism 232 is configured by a first shearing die 233 and a second shearing die 234. The first shearing die 233 is reciprocated along a direction perpendicular to the feeding direction of a thin metal plate 225A (a direction perpendicular to the surface of FIG. 25) by a non-illustrated offset mechanism. The second shearing die 234 is reciprocated along an up-and-down direction by a non-illustrated lift mechanism and along a direction perpendicular to the feeding direction of the thin metal plate 225A by the offset mechanism.

Figure 26:
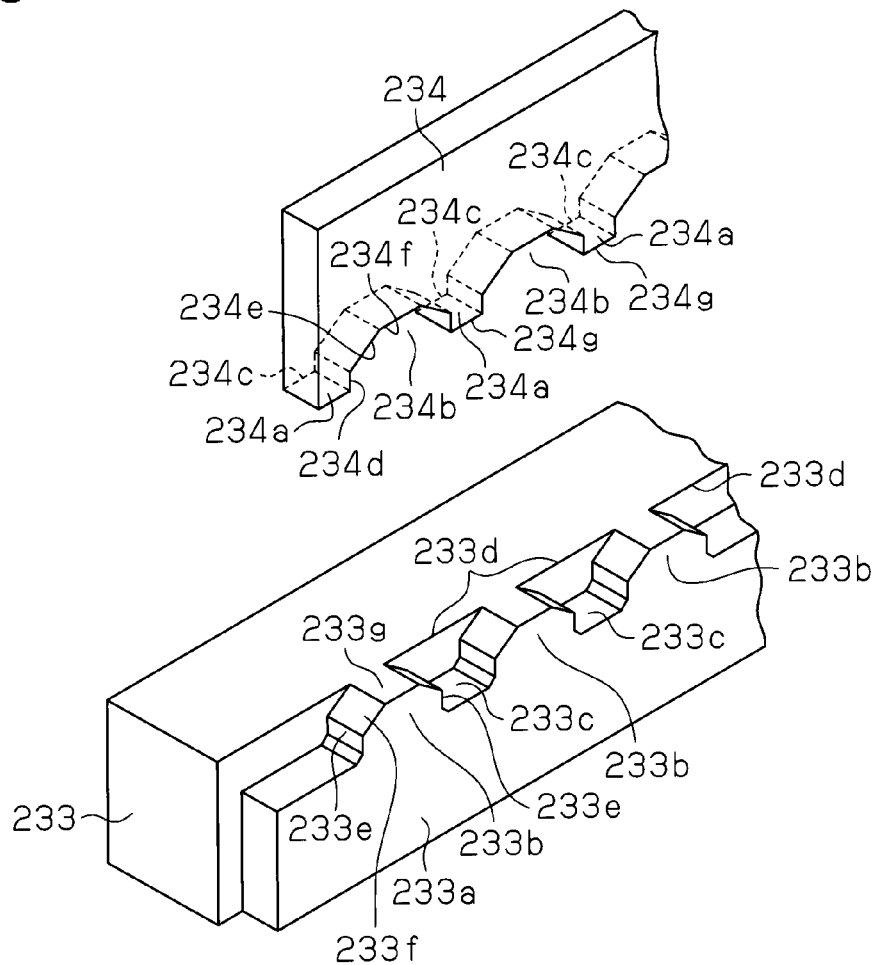
FIG. 26 is a partial perspective view showing a first shearing die and a second shearing die.

As shown in FIG. 26, the first shearing die 233 has a side wall 233*a* at the downstream side of the feeding direction of the thin metal plate 225A. Projections 233*b* serving as first projections and recesses 233*c* serving as first recesses are alternately formed in an upper portion of the side wall 233*a*. The projections 233*b* and the recesses 233*c* are spaced apart at a predetermined horizontal pitch. Projections 234*a* serving as second projections, which are engaged with the recesses 233*c* of the first shearing die 233, and recesses 234*b* serving as second recesses, which are engaged with the projections 233*b* of the first shearing die 233, are formed in a lower portion of the second shearing die 234. The projections 234*a* and the recesses 234*b* are formed alternately in the lower portion of the second shearing die 234. The projections 234*a* and the recesses 234*b* are spaced apart at a predetermined horizontal pitch. Each of the recesses 233*c* of the first shearing die 233 has a side surface at the upstream side of the feeding direction of the thin metal plate 225A. A shearing edge 233*d*, which forms a cut in the thin metal plate 225A, is formed along the upper end of the side surface of each recess 233*c*. A shearing edge 234*c*, which has an inverted trapezoidal shape, is formed along the lower end and the two side ends of each of the projections 234*a* of the second shearing die 234. The shearing edges 234*c* are located at the positions corresponding to the shearing edges 233*d*. The shearing edges 234*c* cooperate with the shearing edge 233*d* to form cuts in the thin metal plate 225A.

With reference to FIG. 26, a pair of forming surfaces 233*e*, a pair of forming surfaces 233*f*, and a forming surface 233*g* are formed in each of the projections 233*b* of the first shearing die 233. The forming surfaces 233*e* form the inner surfaces of the two first side plate portions 227*a* of each annular portion 227 (the outer surfaces of the second side plate portions 227*e*). The forming surfaces 233*f* form the inner surfaces of the two first inclined plate portions 227*b*. The forming surface 233*g* forms the inner surface of the flat plate portion 227*c*. Similarly, a pair of forming surfaces 234*d*, a pair of forming surfaces 234*e*, and a forming surface 234*f* are formed in each of the recesses 234*b* of the second shearing die 234. The forming surfaces 234*d* form the outer surfaces of the first side plate portions 227*a* of each annular portion 227 (the inner surfaces of the second side plate portions 227*e*). The forming surfaces 234*e* form the outer surfaces of the first inclined plate portions 227*b* of the annular portion 227 (the inner surfaces of the second inclined plate portions 227*d*). The forming surface 234*f* forms the outer surface of the flat plate portion 227*c*. A forming surface 234*g*, which forms the inner surface of the flat plate portion 227*f* of the annular portion 227, is formed along the lower end of each projection 234*a* of the second shearing die 234.

Figure 25:
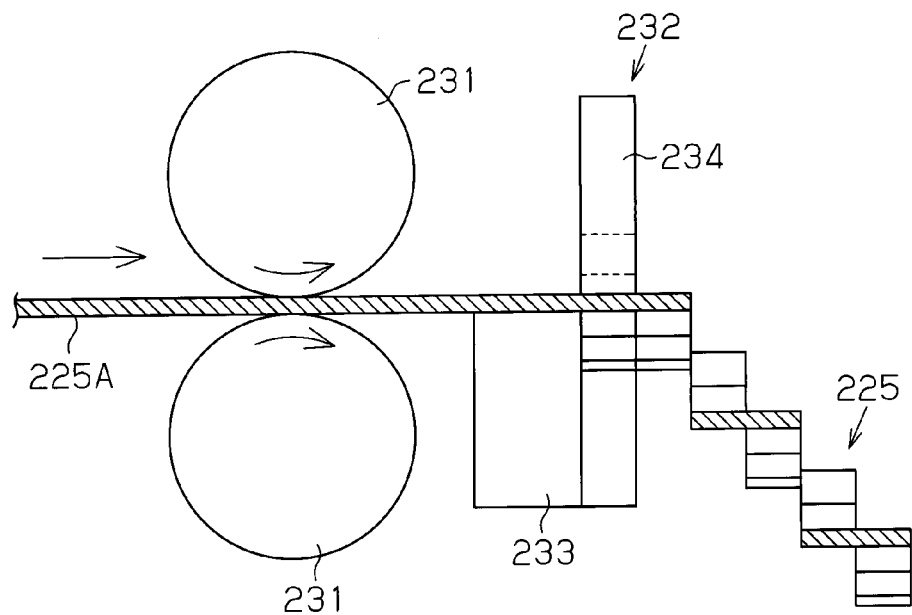
FIG. 25 is a cross-sectional view showing a metal lath machining device.
Figure 27:
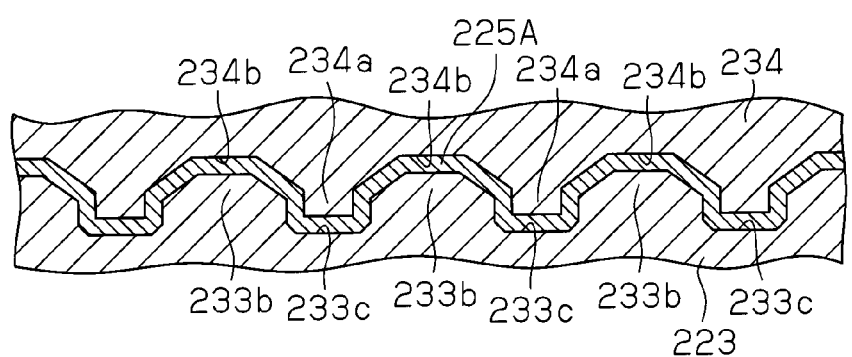
FIG. 27 is a partial cross-sectional view showing the metal lath machining device, illustrating the operation of the device.

With reference to FIG. 25, feed rollers 231 move the thin metal plate 225A from the first shearing die 233 to the second shearing die 234 by a predetermined machining pitch. In this state, the shearing edges 233d of the first shearing die 233 and the shearing edges 234c of the second shearing die 234, which descends, shear a portion of the thin metal plate 225A. In this manner, a plurality of cuts are formed in the thin metal plate 225A. Then, the second shearing die 234 descends to the lowermost position and depresses the thin metal plate 225A thereby bending and stretching the thin metal plate 225A by means of the projections 234a of the second shearing die 234. As illustrated in FIG. 27, the bent-stretched portion of the thin metal plate 225A is formed substantially like a trapezoid. Afterwards, the second shearing die 234 rises from the lowermost position and returns to the original position.

Then, the feed rollers 231 move the thin metal plate 225A to the forming mechanism 232 again by a predetermined pitch. Synchronously, the first shearing die 233 and the second shearing die 234 move leftward or rightward by the distance corresponding to the half the alignment pitch of the annular portions 227. The second shearing die 234 then re-descends to form cuts in the thin metal plate 225A at positions offset by half pitches in a leftward or rightward direction from the previously machined bent-stretched portion, and bends and stretches the thin metal plate 225A. In this manner, the annular portions 227 having the through holes 226 are formed, and a metal lath 225 is completed.

Figure 28:
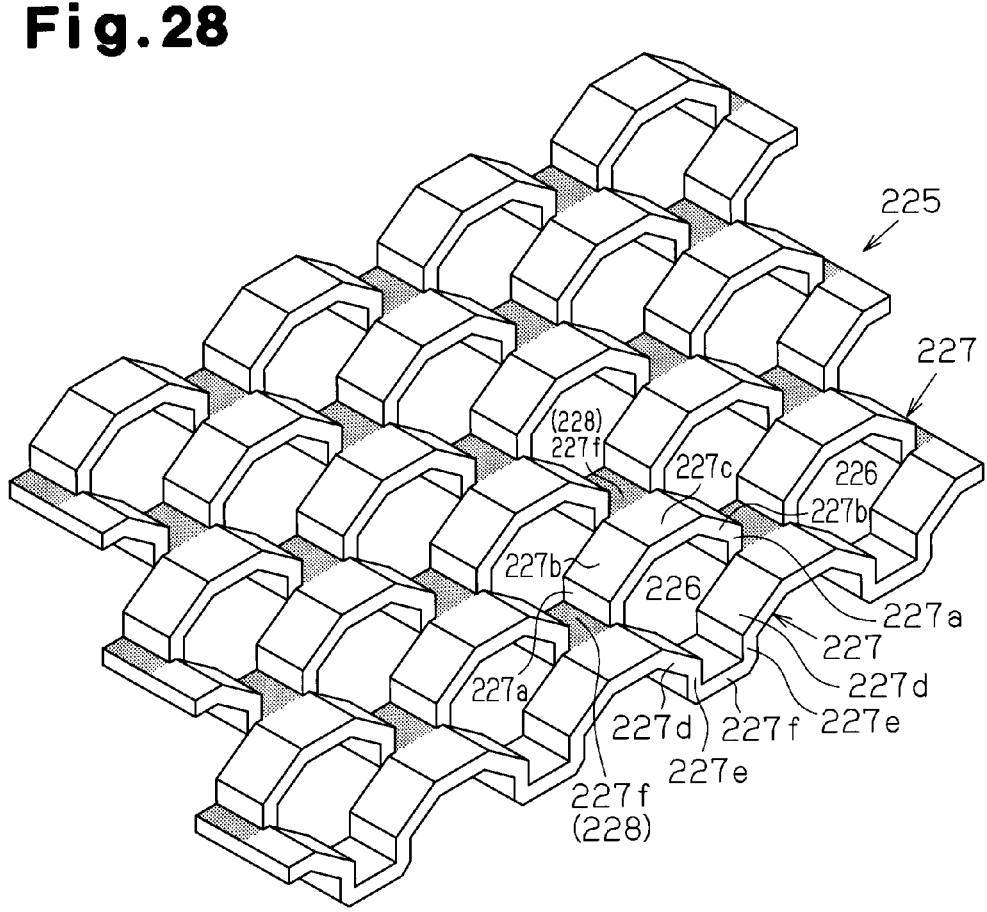
FIG. 28 is a partial perspective view showing a metal lath.
Figure 29:
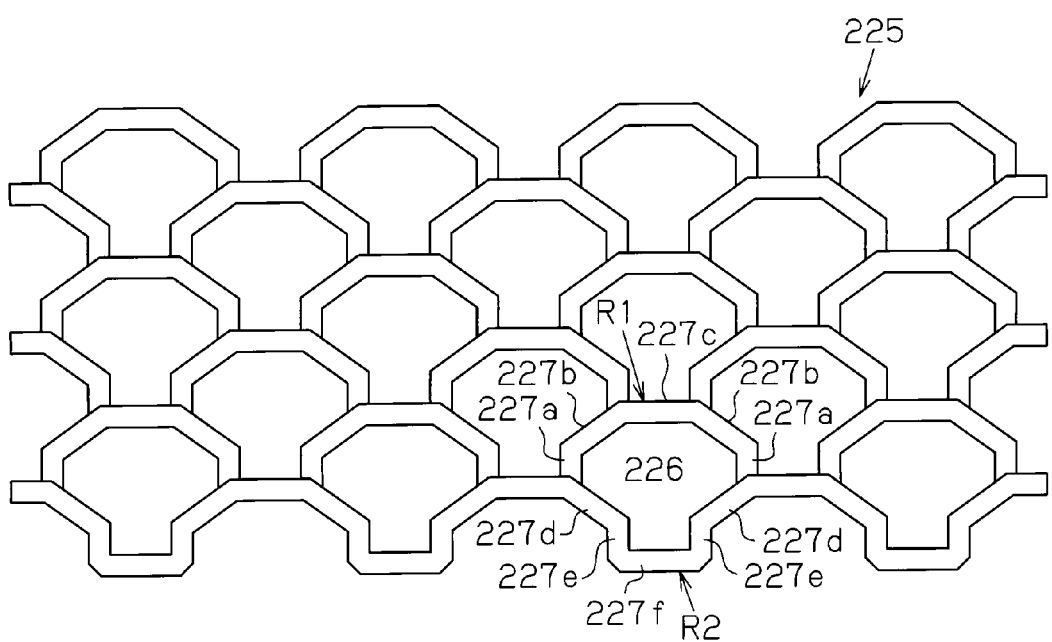
FIG. 29 is a partial front view showing the metal lath.
Figure 30:
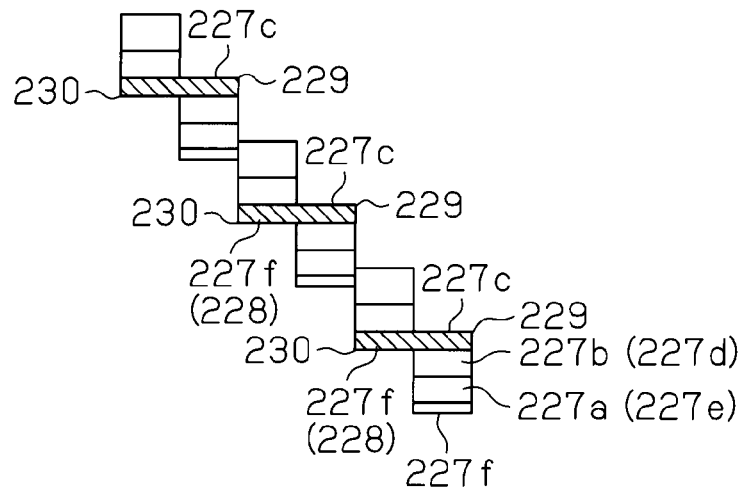
FIG. 30 is a cross-sectional view showing the metal lath.

By repeating the above-described operation, the multiple through holes 226 are formed in the metal lath 225 in a mesh-like manner, and the annular portions 227 are arranged in a staggered manner, as illustrated in FIGS. 28 and 29. In this state, the protections 233b and the recesses 233c of the first shearing die 233 are engaged with the corresponding projections 234a and the corresponding recesses 234b of the second shearing die 234. In this manner, non-machined portions free from machining by the second shearing die 234, which descends, exist in the metal lath 225. The non-machined portions form the joint plate portions 228 (the second flat plate portions 227f). Through the joint plate portions 228, the annular portions 227 are connected together in a mutually overlapping state. As a result, the metal lath 225 having a stepped cross section, as illustrated in FIG. 30, is formed.

Figure 31:
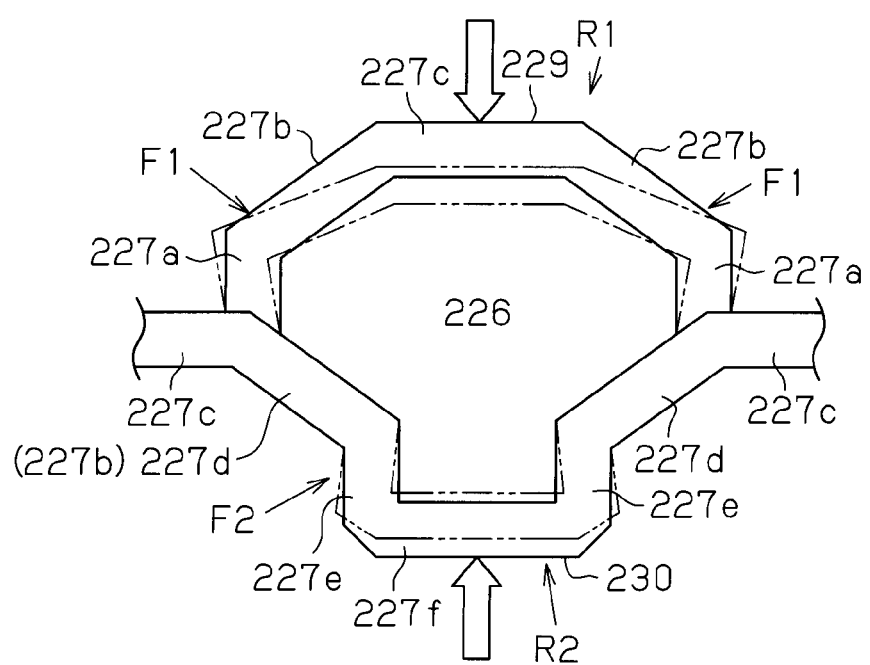
FIG. 31 is an enlarged partial front view showing an annular portion of the metal lath.

As illustrated in FIG. 31, each annular portion 227 is formed in a polygonal shape. In the annular portion 227, the first side plate portions 227a and the first inclined plate portions 227b configuring the semi-annular portion R1 form a first deformation allowing portion F1, which allows plastic deformation of the first flat plate portion 227c when the first flat plate portion 227c is pressed downward. Accordingly, when external force acts downward on the flat plate portion 227c, the first deformation allowing portion F1 is deformed as indicated by the corresponding double-dotted chain lines in FIG. 31. Further, the second side plate portions 227e configuring each semi-annular portion R2 form a second deformation allowing portion F2, which allows plastic deformation of the second flat plate portion 227f when the second flat plate portion 227f is pressed upward. Accordingly, when external force acts upward onto the second flat plate portion 227f, the second deformation allowing portion F2 is deformed as indicated by the corresponding double-dotted chain lines in FIG. 31.

The amount of deformation of the first deformation allowing portion F1 is set to exceed the amount of deformation of the second deformation allowing portion F2 when the same external force acts on the first deformation allowing portion F1 and the second deformation allowing portion F2. When the external force acts downward on the first flat plate portion 227c of the first deformation allowing portion F1, the force is transmitted to the first side plate portions 227a through the first inclined plate portions 227b. This deforms each first side plate portion 227a leftward or rightward about the proximal end of the first side plate portion 227a and pivots each first inclined plate portion 227b downward about the joint portion between the first inclined platen portion 227b and the corresponding first side plate portion 227a. In other words, the first deformation allowing portion F1 is configured easily deformable in response to external force. When the external force acts upward onto the second flat plate portion 227f of the second deformation allowing portion F2, each second inclined plate portion 227d is maintained in the current state without being pivoted about the proximal end of the second inclined plate portion 227d. Each second side plate portion 227e is deformed only slightly leftward or rightward about the proximal end of the second side plate portion 227e. That is, the second deformation allowing portion F2 is configured in such a manner that the second deformation allowing portion F2 less deformable than the first deformation allowing portion F1.

A method for forming the first and second flat surface portions 229a, 230a in the corresponding first and second contact portions 229, 230 of the metal lath 225 will hereafter be described. Since the configuration of the pressing machine for forming the first and second flat surface portions 229a, 230a is identical to the configuration of the pressing machine 48 according to the first embodiment illustrated in FIG. 10, description of the pressing machine for forming the first and second flat surface portions 229a, 230a will be omitted herein.

Figure 32:
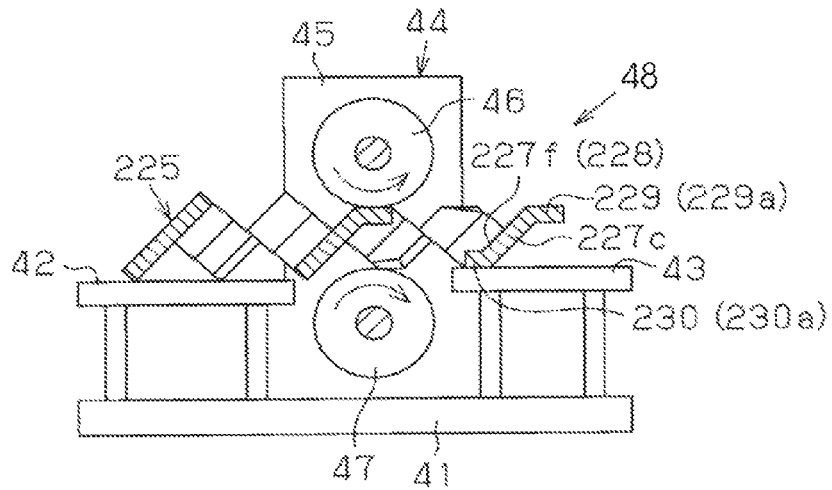
FIG. 32 is a front view showing a pressing device.

First, the metal lath 225 is sent from the table 42 to the position between the compression rollers 46, 47, which rotate as indicated by the arrows in FIG. 32. The compression rollers 46, 47 then compress the metal lath 225 from above and below, and move the metal lath 225 rightward as viewed in FIG. 32. In this manner, the first and second contact portions 229, 230 of the metal lath 225 are compressed from above and below by a predetermined amount. By deforming the first and second contact portions 229, 230, the first flat surface portion 229a is formed in the first contact portion 229 and the second flat surface portion 230a is formed in the second contact portion 230. With reference to FIG. 31, the first deformation allowing portion F1 of each semi-annular portion R1 is more likely to be compressed than the second deformation allowing portion F2 of each semi-annular portion R2. As a result, as illustrated in FIG. 24, the width W1 of the first flat surface portion 229a of each first contact portion 229 in the direction of the gas flow passage becomes greater than the width W2 of the second flat surface portion 230a of each second contact portion 230.

Figure 33:
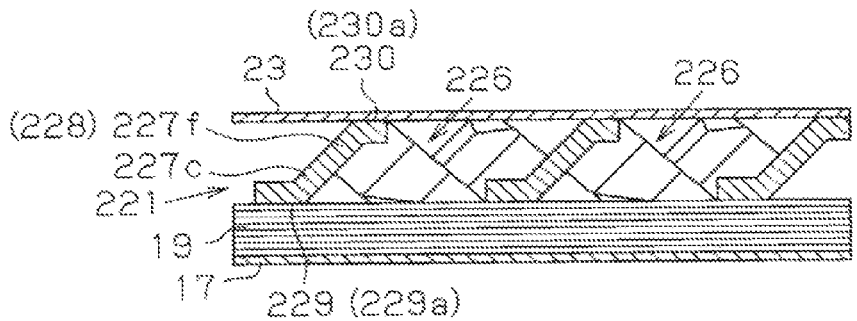
FIG. 33 is an enlarged cross-sectional view showing a stacking structure including a gas diffusion layer, a first gas flow passage forming member, and a first separator.

When the metal lath 225 is completed, the metal lath 225 is cut to a predetermined size so that the first and second gas flow passage forming members 221, 222 are completed. As illustrated in FIG. 33, the complete first gas flow passage forming member 221 is incorporated in each power generation cell 12 with the first flat surface portions 229a held in surface contact with the upper surface of the gas diffusion layer 19 and the second flat surface portions 230a held in surface contact with the backside of the first separator 223.

The second embodiment has the advantages described below.

(1) With reference to FIG. 31, the easily deformable first deformation allowing portion F1 is arranged in the semi-annular portion R1 of each annular portion 227, and the less deformable second deformation allowing portion F2 is formed in the semi-annular portion R2 of the annular portion 227. The first and second flat surface portions 229a, 230a are formed in the corresponding first and second contact portions 229, 230 of the metal lath 225. The first and second flat surface portions 229a, 230a are formed by compressing the two surfaces of the metal lath 225 using the compression rollers 246, 247. The width W1 of each first flat surface portion 229a is set to be greater than the width W2 of each second flat surface portion 230a. Accordingly, despite the use of the compression rollers 246, 247, the width W2 of the second flat surface portion 230a is set to an appropriate value regardless of the width W1 of the first flat surface portion 229a. As a result, the width W2 of the second flat surface portion 230a is set to such a value that the inner surface of the separator 23 cannot be damaged. Also, an appropriate current carrying surface area between the outer surface of the separator 23 and each second flat surface portion 230a is maintained. Accordingly, as illustrated in FIG. 24, the thickness T of the gas flow passage forming member 221, which is the effective surface area of the gas flow passage of the gas flow passage forming member 221, is maintained appropriately. This reduces pressure loss of the gas supplied to the gas flow passage and maintains appropriate power generation efficiency. If the width W2 of the second flat surface portion 230a of the second contact portion 230 is set to be equal to the width W1 of the first flat surface portion 229a, the thickness T of the gas flow passage forming member 221 is decreased and thus the effective surface area of the gas flow passage is reduced, as indicated by the corresponding chain lines in FIG. 24.

The second embodiment may be modified to the forms described below.

Figure 34:
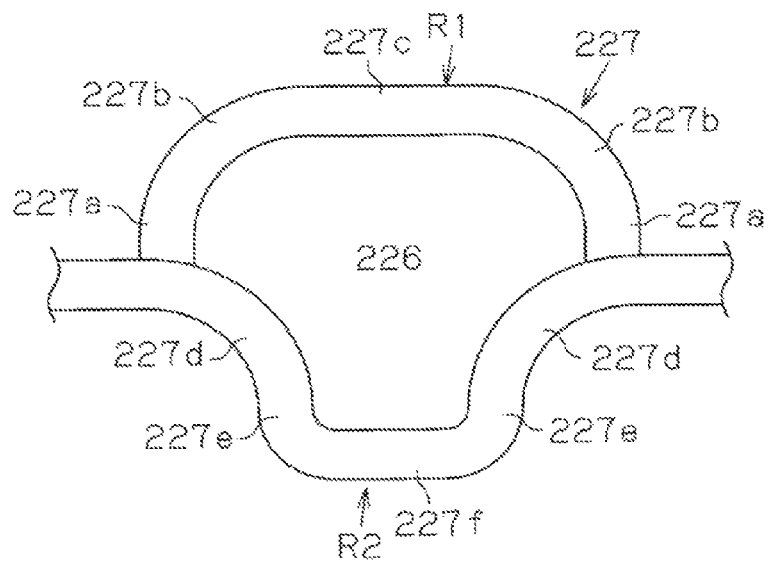
FIG. 34 is a partial front view showing an annular portion according to another embodiment.

As shown in FIG. 34, the first inclined plate portions 227b and the second inclined plate portions 227d of each annular portion 227 may be formed in an arcuate shape. Specifically, the annular portion 227 may have a smooth shape as a whole.

The first shearing die 233 illustrated in FIG. 26 may be divided into a body having the shearing edges 233d and a shearing plate having the projections 233b and the recesses 233c. In this case, the shearing plate of the first shearing die 233 is located at the position corresponding to the second shearing die 234. Further, in this case, the body of the first shearing die 233 is fixed at a predetermined position and the shearing plate is formed to reciprocate in a horizontal direction.

In the second embodiment, to form the semi-annular portions R1, R2, the first shearing die 233 and the second shearing die 234 are moved to the positions offset leftward or rightward by the distance corresponding to the half the pitch of the projections 234a and the recesses 234b of the second shearing die 234. However, the offset amount may be changed as needed. Further, arrangement of the annular portions 227 is not restricted to the staggered arrangement.

Third Embodiment

A third embodiment of the present invention will now be described with reference to FIGS. 35 to 48. Detailed description of components of the third embodiment that are like or same as corresponding components of the first or second embodiments will be omitted herein.

Figure 35:
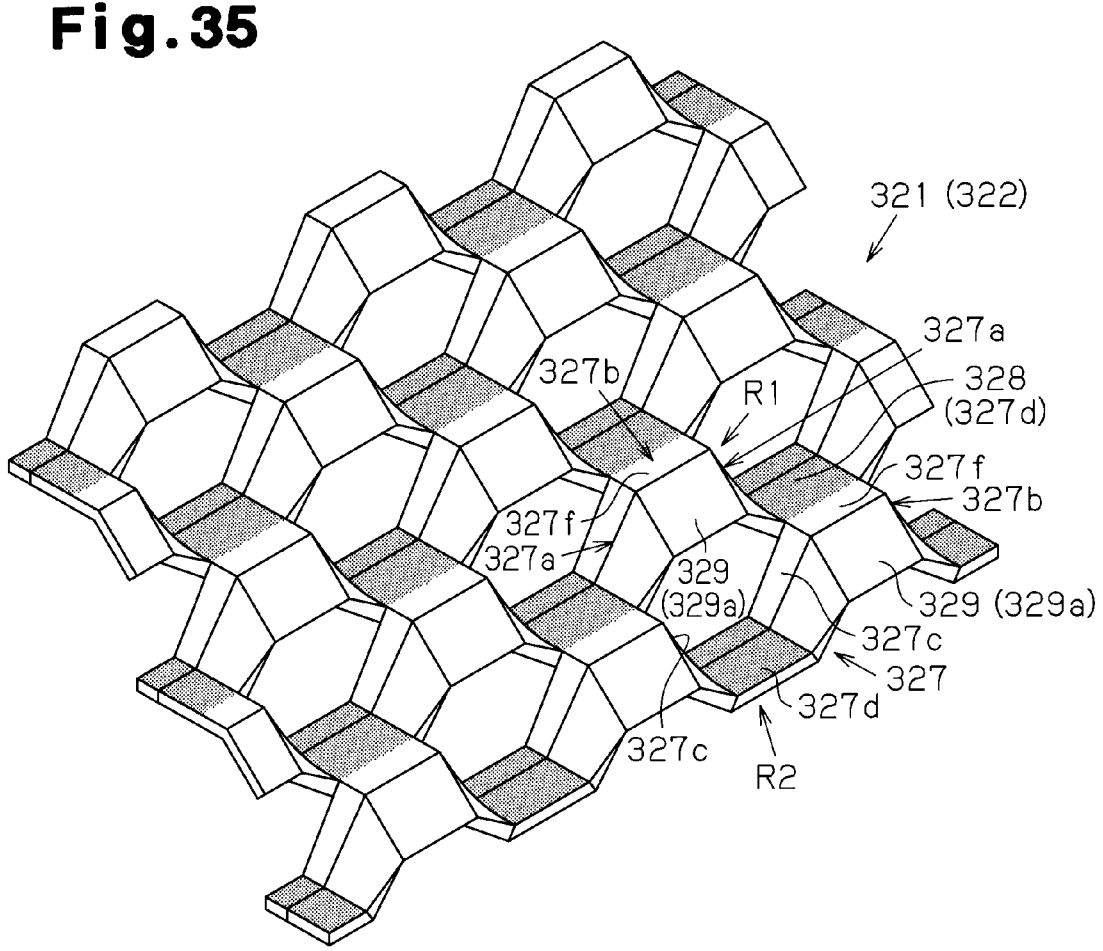
FIG. 35 is a partial perspective view showing a gas flow passage forming member according to a third embodiment of the invention.
Figure 36:
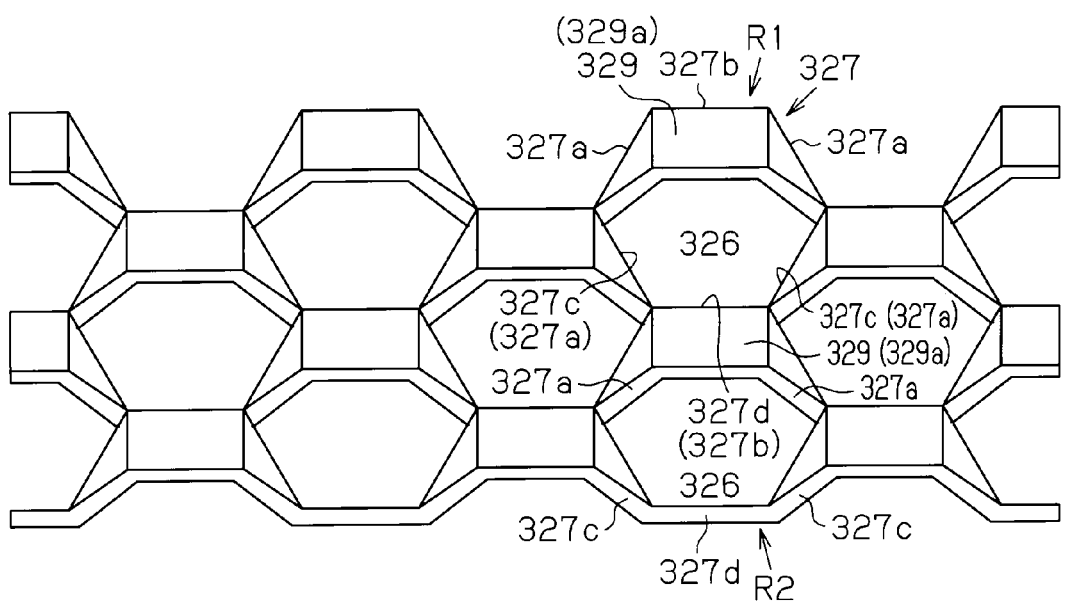
FIG. 36 is a front view showing a portion of a first gas flow passage forming member.

As illustrated in FIGS. 35 and 36, the upper semi-annular portion R1 of each annular portion 327 is configured by a pair of first inclined plate portions 327a and a first flat plate portion 327b. The two first inclined plate portions 327a face each other. The first flat plate portion 327b is integrated with the inclined plate portions 327a in such a manner as to connect the upper ends of the inclined plate portions 327a to each other. The lower semi-annular portion R2 of each annular portion 327 is configured by a pair of second inclined plate portions 327c and a second flat plate portion 327d. The two second inclined plate portions 327c face each other. The second flat plate portion 327d is integrated with the inclined plate portions 327c in such a manner as to connect the upper ends of the inclined plate portions 327c to each other.

Figure 37:
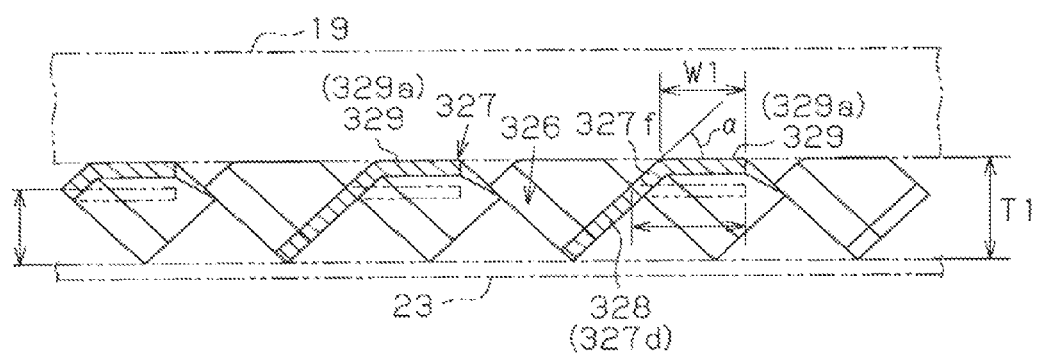
FIG. 37 is a cross-sectional view showing a portion of the first gas flow passage forming member.
Figure 38:
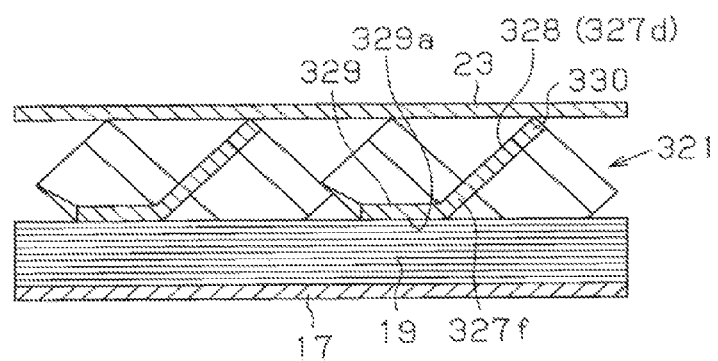
FIG. 38 is a cross-sectional view showing a stacking structure including a gas diffusion layer, the first gas flow passage forming member, and a first separator.

With reference to FIG. 35, a joint plate portion 328 is identical with the second flat plate portion 327d of each annular portion 327. A first contact portion 329 facing the second flat plate portion 327d of the annular portion 327 is formed in the first flat plate portion 327b of the annular portion 327. When incorporated in the power generation cell 12, the first contact portions 329 contact a surface of the gas diffusion layer 19. Specifically, a bent flat surface portion 329a is formed in each of the first contact portions 329. With reference to FIG. 37, the bent flat surface portions 329a are held in surface contact with the gas diffusion layer 19 (20). A second contact portion 330 facing the first flat plate portion 327b of each annular portion 327 is formed in the second flat plate portion 327d of the annular portion 327. Incorporated in the power generation cell 12, the second contact portions 330 linearly contact the inner surface of the first or second separator 23, 24, as illustrated in FIG. 38.

A non-bent flat surface portion 327f, which is substantially flush with the joint plate portions 328, is formed in each first flat plate portion 327b at a position between the corresponding bent flat surface portion 329a and the joint plate portion 328 (the lower flat plate portion 327d). The first flat plate portion 327b is formed by the non-bent flat surface portion 327f and the bent flat surface portion 329a. With reference to FIG. 37, the bending angle α of the bent flat surface portion 329a with respect to the joint plate portion 328 (the non-bent flat surface portion 327f) is set in the range from 60° to 70°. In the third embodiment, the bending angle α is set to 65°.

A metal lath forming device for forming the first and second gas flow passage forming members 321, 322 will now be described.

Figure 39:
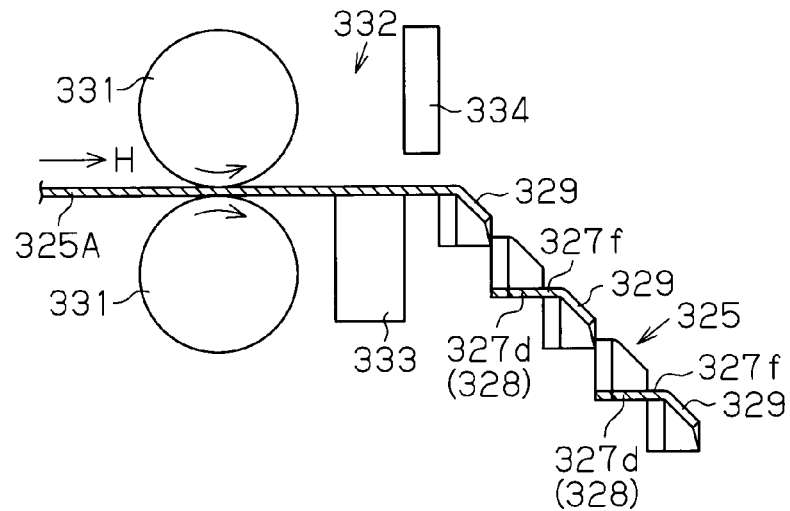
FIG. 39 is a cross-sectional view showing a metal lath forming device for a metal lath.
Figure 40:
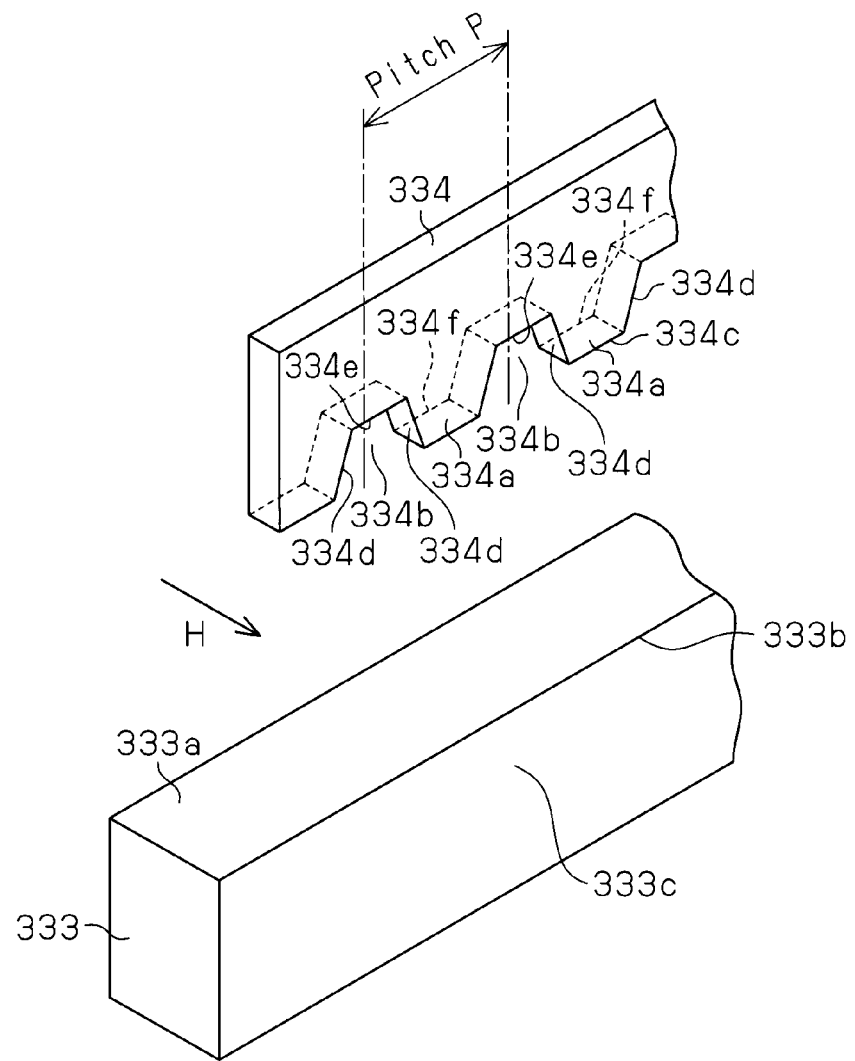
FIG. 40 is a perspective view showing a portion of a first shearing die and a portion of a second shearing die.

As illustrated in FIG. 40, a forming mechanism 332 includes a first shearing die 333 and a second shearing die 334. The first shearing die 333 is fixed to a non-illustrated support table. A non-illustrated lift mechanism reciprocates the second shearing die 334 in an up-and-down direction. A non-illustrated offset mechanism reciprocates the second shearing die 334 in the direction of the width of a thin metal plate 325A, which is the direction of the rotational axis of each feed roller 331 (a direction perpendicular to the surface of FIG. 39). A top surface 333a of the first shearing die 333 functions as a surface supporting the thin metal plate 325A. A linear first shearing edge 333b is formed along an end of the top surface 333a of the first shearing die 333 at a downstream side of the feeding direction H of the thin metal plate 325A. A flat position restriction surface 333c is formed below the first shearing edge 333b.

A plurality of projections 334a are formed in a lower portion of the second shearing die 334 and spaced apart at a predetermined horizontal pitch. A horizontal forming surface 334c is formed at the lower end of each of the projections 334a of the second shearing die 334. Inclined forming surfaces 334d are formed on opposite left and right surfaces of each projection 334a. A horizontal forming surface 334e is formed between the corresponding inclined forming surfaces 334d of each adjacent pair of the projections 334a. The inclined forming surfaces 334d and the horizontal forming surfaces 334e define a plurality of recesses 334b. The recesses 334b are formed alternately with the projections 334a. A second shearing edge 334f, which has an inverted trapezoidal shape, is formed along an end of each horizontal forming surface 334c and ends of the associated inclined forming surfaces 334d at an upstream side of the feeding direction H of the thin metal plate 325A. The second shearing edges 334f cooperate with the first shearing edge 333b to form cuts in the thin metal plate 325A.

A method for forming the gas flow passage forming members 321, 322 using the forming device configured as described above will hereafter be described with reference to FIGS. 41 to 48.

Figure 41A:
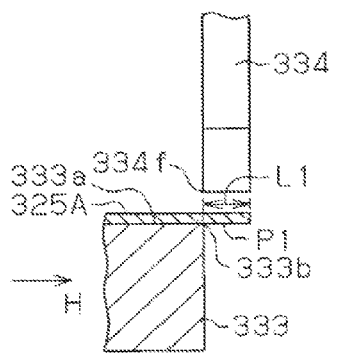
FIGS. 41(a) and 41(b) are a cross-sectional side view and a front view showing a step of manufacturing a gas flow passage forming member.
Figure 41B:
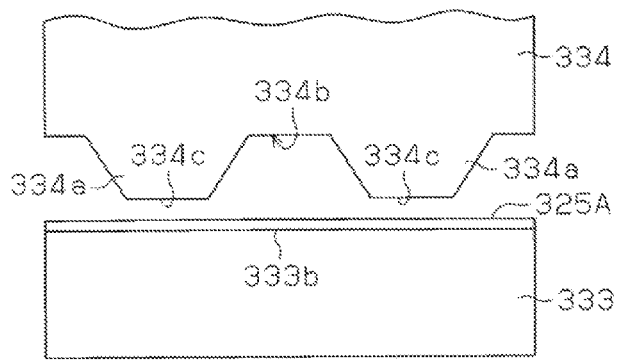
Figure 42A:
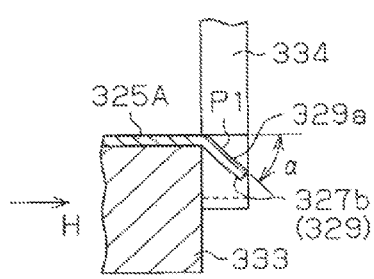
FIGS. 42(a) and 42(b) are a cross-sectional side view and a front view showing a step of manufacturing the gas flow passage forming member.
Figure 42B:
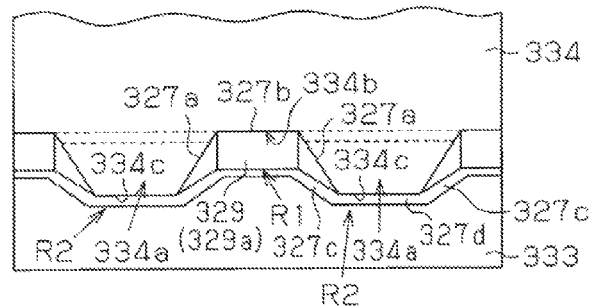

According to a method of the third embodiment, a plurality of first portions-to-be-machined P1 and a plurality of second portions-to-be-machined P2, which are arranged alternately along the feed direction H of the thin metal plate 325A, are defined in the thin metal plate 325A. The first portions-to-be-machined P1 and the second portions-to-be-machined P2 are sequentially machined in the thin metal plate 325A. In a first step, as illustrated in FIG. 41(a), the feed rollers 331 (see FIG. 39) move the first portions-to-be-machined P1 of the thin metal plate 325A to an intermediate machining position with respect to the first shearing die 333 and the second shearing die 334. In other words, an end of the thin metal plate 325A is sent forward in the feeding direction H by a predetermined first feeding amount L1 (for example, 0.2 mm) from the first shearing edge 333b. In this state, the second shearing die 334 descends toward the first shearing die 333 and the first shearing edge 333b and the second shearing edges 334f shear a portion of each first portion-to-be-machined P1, thus forming a plurality of cuts in the thin metal plate 325A. Subsequently, with reference to FIGS. 42(a) and 42(b), the second shearing die 334 descends to a lowermost position. This downwardly bends and stretches the portions of the thin metal plate 325A that contact the projections 334a of the second shearing die 334. In this manner, as illustrated in FIG. 42(b), the bent and stretched portions of the thin metal plate 325A are shaped substantially as inverted trapezoids. Since each one of the portions between the bent and stretched portions enters the corresponding one of the recesses 334b, the portion between the bent and stretched portions is shaped substantially as inverted trapezoids.

In the first step, with reference to FIG. 42(b), the second flat plate portions 327d (the joint plate portions 328) forming the lower semi-annular portions R2 of the annular portions 327 are pressed downward and formed horizontally by the horizontal forming surfaces 334c of the projections 334a. The upper semi-annular portions R1 of the annular portions 327, which are formed in correspondence with the recesses 334b, are not pressed upward by forming portions having horizontal forming surfaces such as the projections 334a. Accordingly, as illustrated in FIG. 42(a), the first flat plate portions 327b of the semi-annular portions R1 formed by the recesses 334b are inclined and suspended downward about the first shearing edge 333b. This forms the bent flat surface portions 329a in such a manner that the bent flat surface portions 329a each have the bending angle α with respect to the horizontal portion of the thin metal plate 325A. Each bent flat surface portion 329a functions as the first contact portion 329. Afterwards, with reference to FIGS. 43(a) and 43(b), the second shearing die 334 returns from the lowermost position to the original upper position.

Figure 43A:
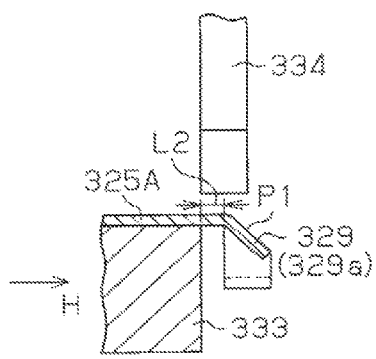
FIGS. 43(a) and 43(b) are a cross-sectional side view and a front view showing a step of manufacturing the gas flow passage forming member.
Figure 43B:
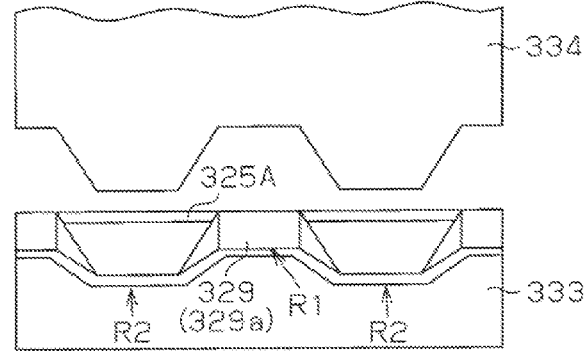
Figure 44A:
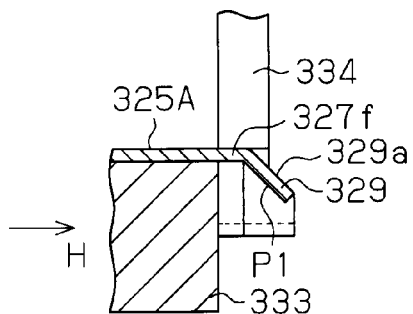
FIGS. 44(a) and 44(b) are a cross-sectional side view and a front view showing a step of manufacturing the gas flow passage forming member.
Figure 44B:
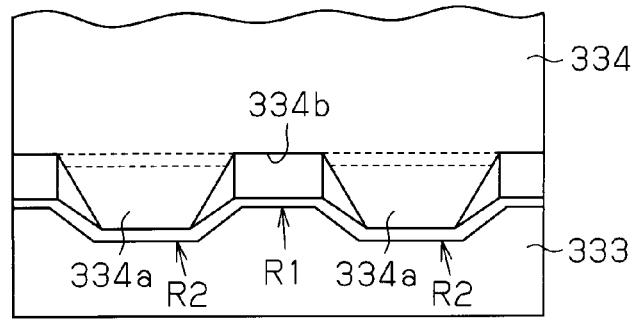

Subsequently, in a second step, with reference to FIG. 43(a), the feed rollers 331 (see FIG. 39) move the thin metal plate 325A by a predetermined second feeding amount L2 (for example, 0.1 mm) in the feeding direction H. In this manner, the first portions-to-be-machined P1 of the thin metal plate 325A are sent to a final machining position with respect to the first shearing die 333 and the second shearing die 334. In this state, as illustrated in FIGS. 44(a) and 44(b), the second shearing die 334 re-descends from the position in the first step without being offset in the direction of the width of the thin metal plate 325A. This forms the upper semi-annular portions R1 and the lower semi-annular portions R2 of the annular portions 327 in the corresponding end of the thin metal plate 325A. At this stage, the first flat plate portions 327b of the upper semi-annular portions R1 are free, like the first contact portions 329. The second feeding amount L2 is set to be smaller than the aforementioned first feeding amount L1. Each first flat plate portion 327b, as a whole, is arranged in the proximity of the first shearing edge 333b. Accordingly, the first flat plate portions 327b are easily arranged along the horizontal forming surfaces 334e of the recesses 334b of the second shearing die 334. As a result, with reference to FIG. 44(a), the first flat plate portions 327b, which are located behind the bent flat surface portions 329a, are maintained substantially horizontal substantially without suspending downward. The first flat plate portions 327b thus form the non-bent flat surface portions 327f. Through the second step, the semi-annular portions R1, R2 including the non-bent flat surface portions 327f are completed.

According to the present invention, the semi-annular portions R1, R2, which are conventionally formed through a single cycle of forming, are formed through two separate cycles as has been described. Specifically, the non-bent flat surface portions 327f are formed after the first cycle in which the bent flat surface portions 329a are formed. Accordingly, compared to a conventional method in which the semi-annular portions R1, R2 are formed through a single cycle, the width of each bent flat surface portion 329a is decreased to an appropriate width.

Figure 45A:
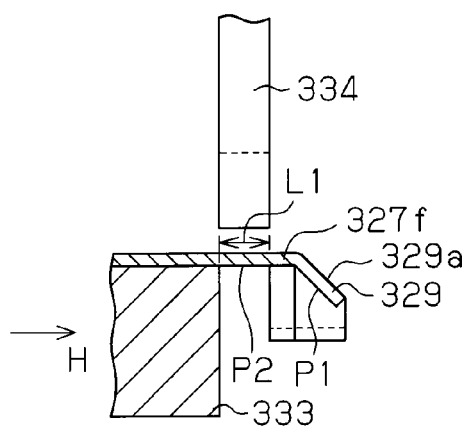
FIGS. 45(a) and 45(b) are a cross-sectional side view and a front view showing a step of manufacturing the gas flow passage forming member.
Figure 45B:
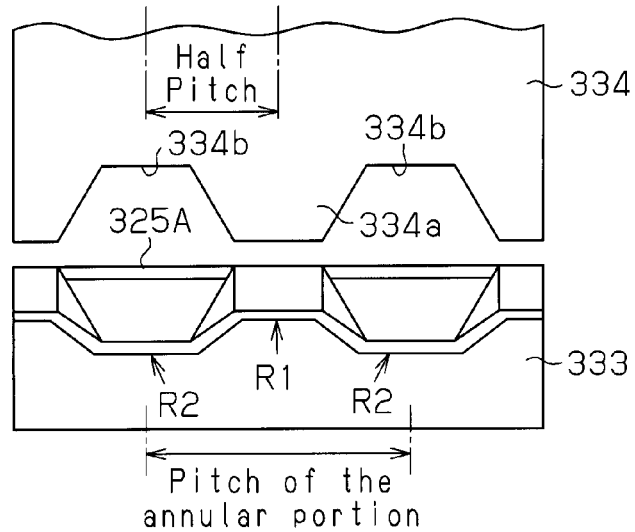
Figure 46A:
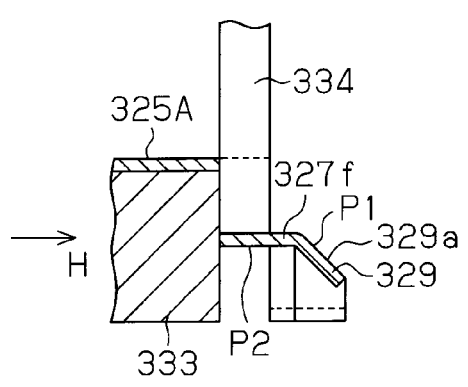
FIGS. 46(a) and 46(b) are a cross-sectional side view and a front view showing a step of manufacturing the gas flow passage forming member.
Figure 46B:
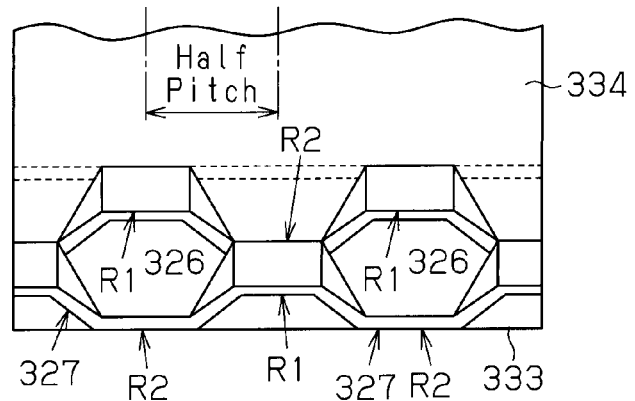

Next, in a third step, as illustrated in FIG. 45(a), after the second shearing die 334 rises to the original position, the second machining target positions P2 adjacent to the first machining target positions P1 are sent to the intermediate forming position with respect to the first shearing die 333 and the second shearing die 334. In other words, the thin metal plate 325A is moved again by the first feeding amount L1 in the feeding direction H. Then, with reference to FIG. 45(b), the second shearing die 334 is offset in the direction of the width of the thin metal plate 325A by half the arrangement pitch (half pitch) of the annular portions 327. Afterwards, the second shearing die 334 descends and forms the second portions-to-be-machined P2, as illustrated in FIGS. 46(a) and 46(b). In this manner, the semi-annular portions R1 are formed above the semi-annular portions R2 and the semi-annular portions R2 are formed below the semi-annular portions R1. As a result, the multiple annular portions 327 are completed.

Then, in a fourth step, with reference to FIGS. 47(a) and 47(b), with the second shearing die 334 offset, the thin metal plate 325A is sent further by the second feeding amount L2. The second portions-to-be-machined P2 are then sent to the final machining position with respect to the first shearing die 333 and the second shearing die 334. With reference to FIGS. 48(a) and 48(b), the second shearing die 334 descends and the semi-annular portions R1, R2 including the non-bent flat surface portions 327f are completed.

Afterwards, the first and second steps and the third and fourth steps are alternately repeated. In this manner, the portions-to-be-machined P1, P2 are machined alternately, and the metal lath 325 illustrated in FIGS. 35 to 37 is completed. Specifically, the metal lath 325 having the multiple through holes 326 arranged in a mesh-like manner is formed in such a manner that the annular portions 327 extend in a meandering manner.

Non-machined portions free from shearing by the second shearing die 334 exist in the metal lath 325. The non-machined portions form the joint plate portions 328 (the second flat plate portions 327d) so that the annular portions 327 are connected together in a mutually overlapping state. As a result, as illustrated in FIGS. 35 and 37, the metal lath 325 having the stepped cross section is formed.

The third embodiment has the advantages described below.

(1) Conventionally, the semi-annular portions R1, R2 of the annular portions 327 have been formed through a single step using the first shearing die 333 having the first shearing edge 333b solely and the second shearing die 334 having the projections 334a and the recesses 334b. According to the present invention, forming of the semi-annular portions R1, R2 is carried out in two steps. Accordingly, compared to the conventional method illustrated in FIG. 37, in which such forming is completed in a single step, the width W1 of each bent flat surface portion 329a is decreased and the thickness T1 of the gas flow passage forming member 321 is set to a great value. This allows for the effective area of the gas flow passage in the gas flow passage forming member 321, thus allowing appropriate supply of gas. As a result, the power generation efficiency is enhanced.

(2) The conventional device illustrated in FIGS. 39 and 40 are used as the metal lath forming device. This simplifies the configuration of the forming device, and the bent flat surface portions 329a are easily formed in the first contact portions 329 of the annular portions 327.

The third embodiment may be modified to the following forms.

Forming surfaces facing the horizontal forming surfaces 334c of the projections 334a of the second shearing die 334 may be formed in a side surface of the first shearing die 333 at the downstream side of the feeding direction H of the thin metal plate 325A. In this case, when the second shearing die 334 descends, the forming surfaces of the first shearing die 333 and the horizontal forming surfaces 334c of the projections 334a hold the thin metal plate 325A. This prevents bending of the second flat plate portions 327d of the annular portions 327.

Figure 47:
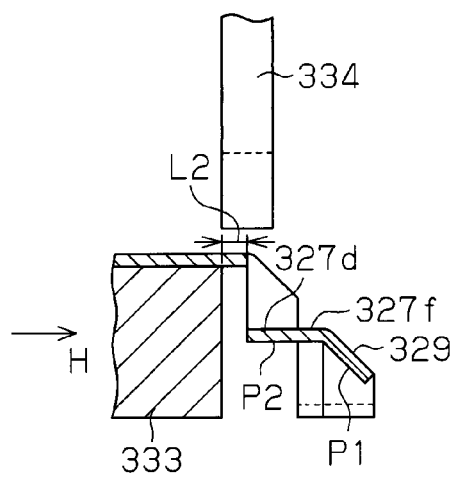
FIGS. 47(a) and 47(b) are a cross-sectional side view and a front view showing a step of manufacturing the gas flow passage forming member.
Figure 47:
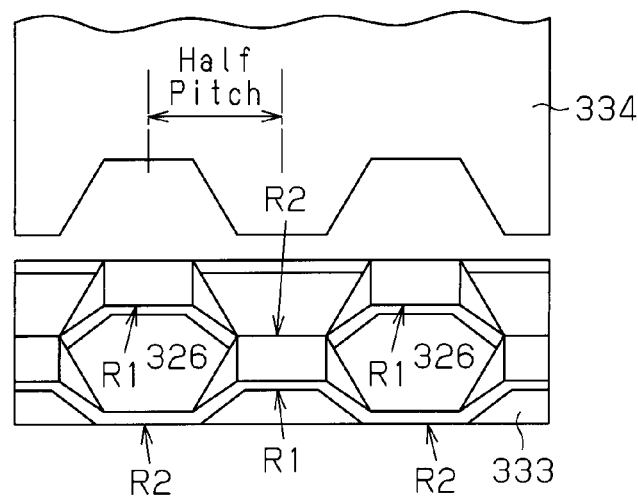
Figure 48:
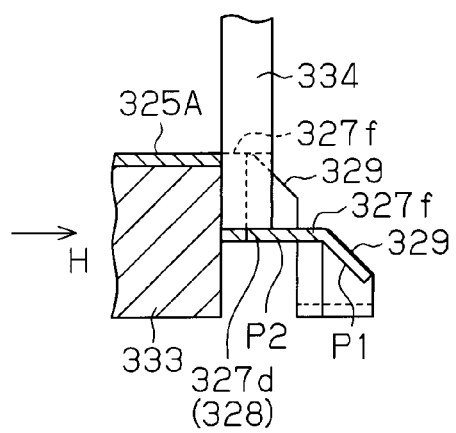
FIGS. 48(a) and 48(b) are a cross-sectional side view and a front view showing a step of manufacturing the gas flow passage forming member.
Figure 48:
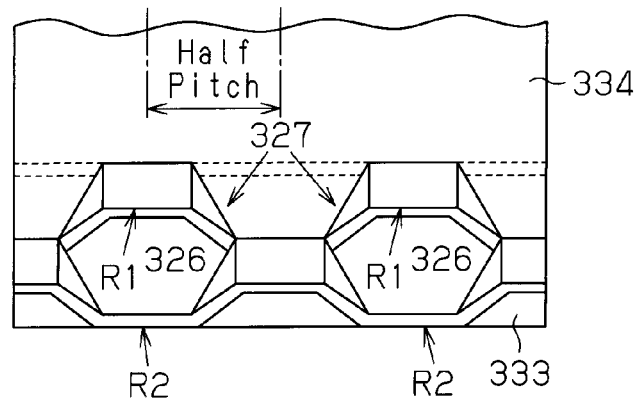
Figure 49:
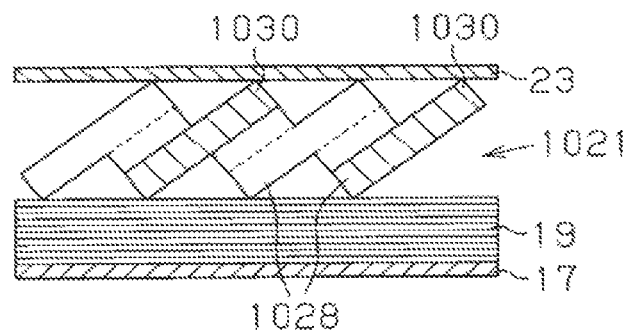
FIG. 49 is a cross-sectional view showing a stacked state of a carbon paper sheet, a first gas flow passage forming member, and a first separator forming a conventional power generation cell.
Figure 50:
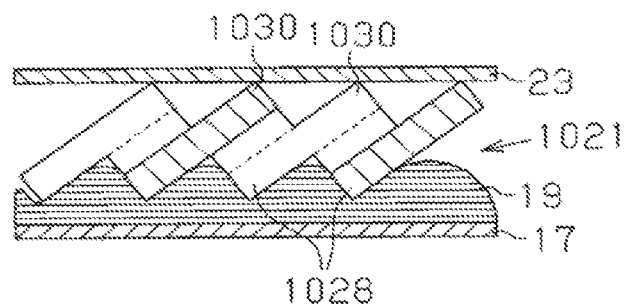
FIG. 50 is a cross-sectional view showing the first separator pressed against the carbon paper sheet.
Figure 51:
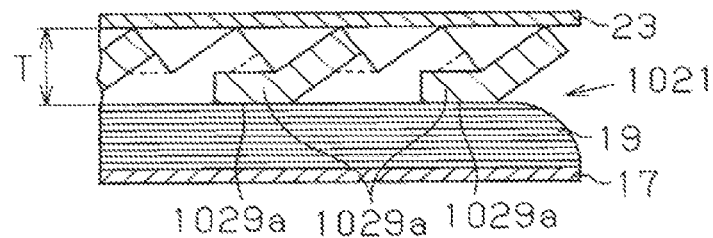
FIG. 51 is a cross-sectional view showing a stacking structure including a gas diffusion layer, a gas flow passage forming member, and a separator of a conventional power generation cell.

The second step illustrated in FIGS. 43 and 44 and the fourth step illustrated in FIGS. 47 and 48 may each be divided into separate multiple semi-steps.

In the third embodiment, the second shearing die 334 is offset in the direction of the width of the thin metal plate 325A by the half the pitch (a half pitch) of the projections 334a and the recesses 334b of the second shearing die 334. However, the offset amount may be changed as needed. Further, the annular portions 327 do not necessarily have to be arranged in a meandering manner.

The shape of each annular portion 327 may be, for example, a pentagonal shape.

The invention claimed is:

1. A gas flow passage forming member of a power generation cell of a fuel battery, the power generation cell including:
   a gas diffusion layer formed in an electrode layer of an electrode structure; and
   a separator for isolating adjacent power generation cells from each other; wherein
   the gas flow passage forming member is arranged between the gas diffusion layer and the separator and includes a gas flow passage,
   the power generation cell is configured to generate power through an electrode reaction caused in the electrode layer by supplying fuel gas or oxidant gas to the electrode layer through the gas flow passage,
   the gas flow passage forming member is configured by a metal lath formed by a metal plate,
   a plurality of through holes is formed in the metal lath,
   the gas flow passage forming member has a plurality of annular portions forming the through holes, and
   the annular portions each include:
      a first flat surface portion in a first contact portion;
      an L-shaped or arcuate portion connected to the first flat surface portion and bent toward a center of a corresponding through hole, the L-shaped or arcuate portion forming at least one side of a cross-sectional shape of the annular portion; and
      a second flat surface portion in a second contact portion, wherein
      at least one of the plurality of through holes is located either between the first contact portion and the separator along an axis that is perpendicular to the first flat surface portion and that passes through the separator, or between the second contact portion and the gas diffusion layer along an axis that is perpendicular to the second flat surface portion and that passes through the gas diffusion layer;
      the first flat surface portion is configured to be held in surface contact with a corresponding surface of the gas diffusion layer; and
      the first flat surface portion is formed by plastically deforming the first contact portion,
   wherein the cross-sectional shape of the annular portion includes an inner border formed by surfaces that face the center of the corresponding through hole, the inner border being formed in part by the first flat surface portion and the L-shaped or arcuate portion
   wherein the inner border includes a first surface formed by the first flat surface portion, a second surface formed by the L-shaped or arcuate portion, and a third surface formed by the L-shape or arcuate portion, and
   wherein the first surface and the second surface are connected to each other and form a first angle of less than 180° facing toward the corresponding through hole, and the second surface and the third surface are connected to each other and form a second angle of less than 180° facing away from the corresponding through hole.

2. The gas flow passage forming member according to claim 1, wherein the first contact portion is disposed between the second contact portion and the gas diffusion layer, and the second contact portion is disposed between the first contact portion and the separator.

3. The gas flow passage forming member according to claim 1, wherein the metal lath has a stepped cross-section.

4. The gas flow passage forming member according to claim 1, wherein the second flat surface portion is configured to be held in surface contact with the separator.

5. The gas flow passage forming member according to claim 1, wherein the annular portions each include two L-shaped or arcuate portions forming at least two sides of the cross-sectional shape of the annular portion.

6. The gas flow passage forming member according to claim 5, wherein the two L-shaped or arcuate portions are respectively connected to opposing sides of the first flat surface portion.

7. The gas flow passage forming member according to claim 5, wherein the two L-shaped or arcuate portions and the first flat surface portion form one half of the cross-sectional shape of the annular portion.

* * * * *